(12) United States Patent
Liu

(10) Patent No.: US 6,839,830 B2
(45) Date of Patent: Jan. 4, 2005

(54) LOGICAL PIPELINE FOR DATA COMMUNICATIONS SYSTEM

(75) Inventor: Ming-Kang Liu, San Jose, CA (US)

(73) Assignee: RealTek Semiconductor Corporation, Hsinchu (TW)

( * ) Notice: Subject to any disclaimer, the term of this patent is extended or adjusted under 35 U.S.C. 154(b) by 673 days.

(21) Appl. No.: 09/798,054

(22) Filed: Mar. 1, 2001

(65) Prior Publication Data
US 2001/0037443 A1 Nov. 1, 2001

Related U.S. Application Data

(60) Provisional application No. 60/185,964, filed on Mar. 1, 2000.

(51) Int. Cl.[7] .................................................. G06F 9/00
(52) U.S. Cl. ...................................................... 712/200
(58) Field of Search ........................................ 712/200

(56) References Cited

U.S. PATENT DOCUMENTS

| | | | | |
|---|---|---|---|---|
| 5,596,742 A | * | 1/1997 | Agarwal et al. | 716/16 |
| 5,819,026 A | * | 10/1998 | Lhotak et al. | 714/38 |
| 6,034,538 A | * | 3/2000 | Abramovici | 326/38 |
| 6,052,773 A | * | 4/2000 | DeHon et al. | 712/43 |
| RE38,127 E | * | 5/2003 | O'Sullivan | 455/557 |

* cited by examiner

Primary Examiner—Eric Coleman
(74) Attorney, Agent, or Firm—Finnegan, Henderson, Farabow, Garrett & Dunner, L.L.P.

(57) ABSTRACT

A new type of pipeline, generally referred to as a logical pipeline is disclosed. A logical pipeline generaly includes a set of hardware based pipeline stages that exchange data through a common pipeline memory, instead of only through intermediate fixed physical buffers. Thus, operational data is retrieved and stored by each stage using a single memory, and this permits flexible and programmable forms of pipelines that can be adapted as needed in response to a desired computation task. A common pipeline clock initiates processing of the data. Another variation is disclosed in the form of a logical "hybrid" pipeline, consisting of both software and hardware based pipeline stages, that are used to perform a set of computations in an interleaved fashion. In this manner, a data item can be handled first by a hardware pipeline stage, followed immediately by a software pipeline stage, etc. Furthermore, in a communications system, this arrangement permits processing for a number of ports to be distributed so that at any pipeline clock period, both hardware and software stages can be operating on different ports, or different communication tasks (i.e., transmit and receive).

45 Claims, 13 Drawing Sheets

Fig. 2A

EMKG Sorting According for ATU-C.

| Design Module | Effective MIPS, ATU-C | ASIC Gates | EMKG, ATU-C | ATU-C Normalized Computation Time |
|---|---|---|---|---|
| FEQ | 2 | 10 | 0.2 | 5 |
| RS Decoder | 12 | 60 | 0.2 | 20 |
| FFT | 18 | 50 | 0.36 | 20 |
| QAM Decoding | 5 | 10 | 0.5 | 15 |
| De-Shuffler | 2 | 4 | 0.5 | 5 |
| Shuffler | 13 | 4 | 3.3 | 20 |
| IFFT | 164 | 50 | 3.3 | 60 |
| RS Encoder | 92 | 24 | 3.8 | 60 |
| QAM Encoding | 40 | 10 | 4.0 | 50 |
| TEQ | 64 | 10 | 6.4 | 5 |

Fig. 2B

EMKG Sorting for ATU-R Blocks

| Design Module | Effective MIPS, ATU-R | ASIC Gates | EMKG, ATU-R | Computation Time, ATU-R |
|---|---|---|---|---|
| RS Encoder | 3 | 24 | 0.1 | 20 |
| Shuffler | 2 | 4 | 0.5 | 5 |
| QAM Encoding | 6 | 10 | 0.6 | 15 |
| FEQ | 13 | 10 | 1.3 | 30 |
| FFT | 74 | 50 | 1.5 | 20 |
| IFFT | 74 | 50 | 1.5 | 20 |
| De-Shuffler | 12 | 4 | 3.0 | 20 |
| QAM Decoding | 33 | 10 | 3.3 | 50 |
| RS Decoder | 202 | 60 | 3.4 | 60 |
| TEQ | 130 | 10 | 13 | 20 |

Fig. 3A

General Data Object Structure

| Field | Bits | Meaning and Use | Remarks |
|---|---|---|---|
| Port ID | 8 | To identify the specific port that the data block belongs to | This field is helpful for port-dependent operations. |
| Common Operation Controls | 4 | Bit 0: ATU-R/C<br>Bit 1: Receive/Transmission<br>Bit 2: Bypass if 1<br>Bit 3: reserved | Useful for the ASIC to know the type of operations it needs to perform. If Bit 2 is one, it will skip the operation but increases it computation count. This is useful for "stuff symbol". |
| Specific Controls | 8 | Meanings are specific to the given ASIC block. For example, for the IFFT, a bit is assigned to indicate whether the CP should be added or not. | |
| Size of Port Specific Control | 12 | This tells the size of port specific control information in bytes | This field is present if Bit 2 of Common Operation Controls is 1 |
| Sequence No. | 16 | DMT symbol sequence. | Only set and tracked by the software at this moment. The number of valid bits is determined by software. |
| Reserved | 16 | | |
| Task/Port Specific Control | Variable | The meaning is dependable on the given ASIC block operation | This field is present if Bit 2 of Common Operation Controls is 1 |
| Data block | Variable | This is the data block as either input or output | |

Fig. 3B

| Field | Bit width | Descriptions | Remarks for scrambling block implementation |
|---|---|---|---|
| Port ID | 8 | To identify the specific port that the data block belongs to | This 8-bit field will be required in the case of scrambler. |
| Common Operation Controls | 4 | Bit 0: ATU-R/C<br>Bit 1: Receive/Transmission<br>Bit 2: bypass if one<br>Bit 3: reserved (0) | There is no difference in operation between scrambling and descrambling. |
| Specific Controls | 8 | Bit 0: reset CRC history registers Bit 1: reserved<br>Bit 2: reset scrambling shift registers<br>Bit 3: reserved<br>Bit 4: reserved<br>Bit 5: reserved<br>Bit 6: single/dual path<br>Bit 7: scrambling mode (1 for frame synchronous, 0 for self synchronous) | When CRC is reset, only the history register is reset.<br>When scrambling is reset, the shift register is reset.<br>If first frame is indicated for CRC, the history registers are reset (both fast and slow).<br>If end frame is indicated for CRC, the result will be loaded to the output register for software to read<br>The above registers refer to those of the transmission side. |
| Size of Port Specific Control | 12 | 2+FDataLength+SDataLength | This covers the following data fields. |
| Sequence No. | 16 | DMT sequence number | Used for software to track |
| CRC output | 8 | CRC register value | Only valid for output |
| Reserved | 8 | | |
| Data Block -1 | 8 | FDataSize | Fast data block size in bytes |
| Data Block -2 | 8 | SDataSize | Slow data block size in byte |
| Data Block -3 | 8 | Rf | Preset for subsequent RS encoder |
| Data Block -4 | 8 | Ri | Preset for subsequent RS encoder |
| Data Block -5 | 32 | Ceiling of FdataSize/4 = FDataLength | Fast path data |
| Data Block -6 | 32 | Ceiling of SdataSize/4 = SDataLength | Slow path data |
| Data block | Variable | This is the data block as either input or output | |

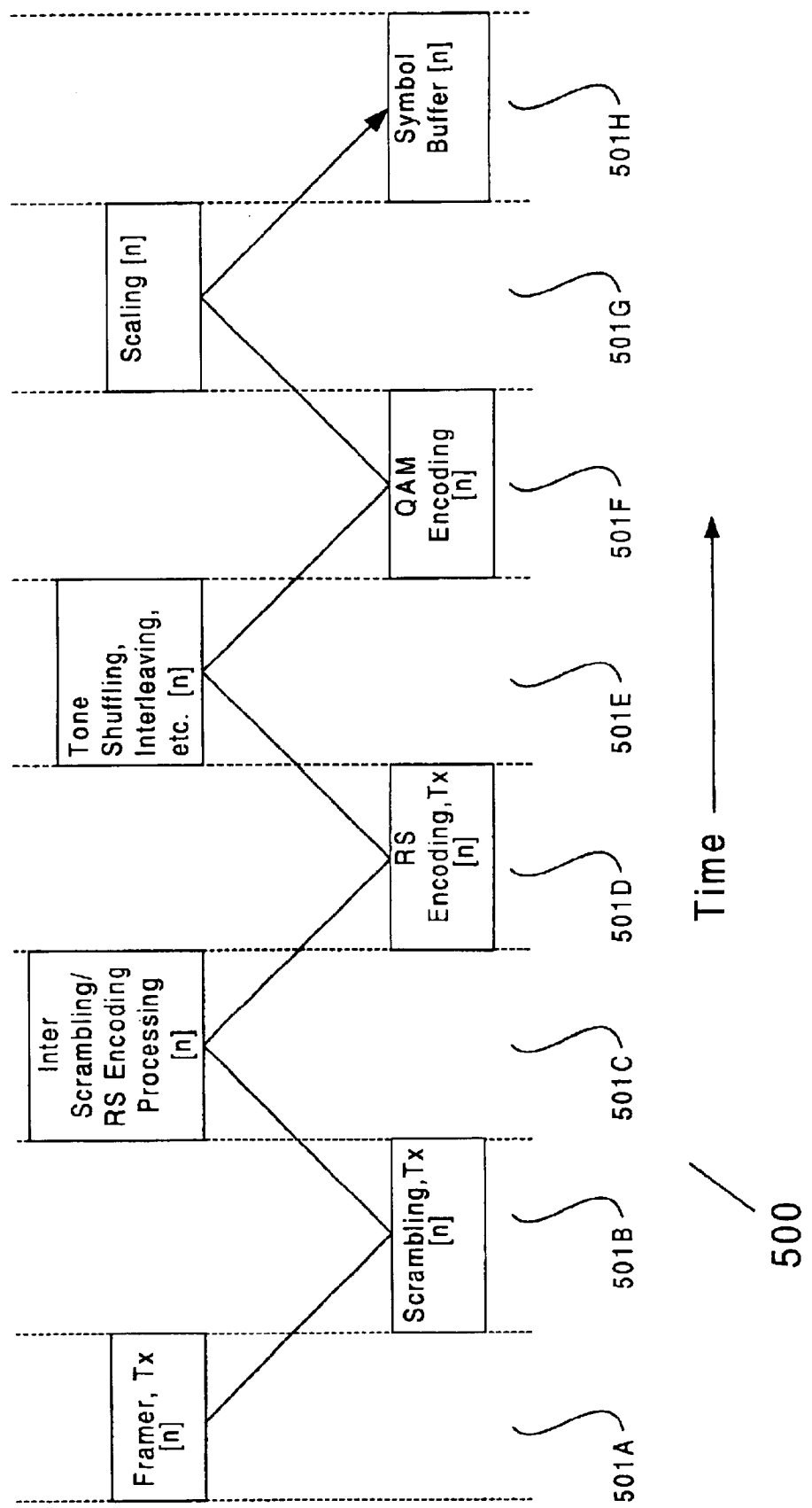

Interaction between software and ASIC tasks

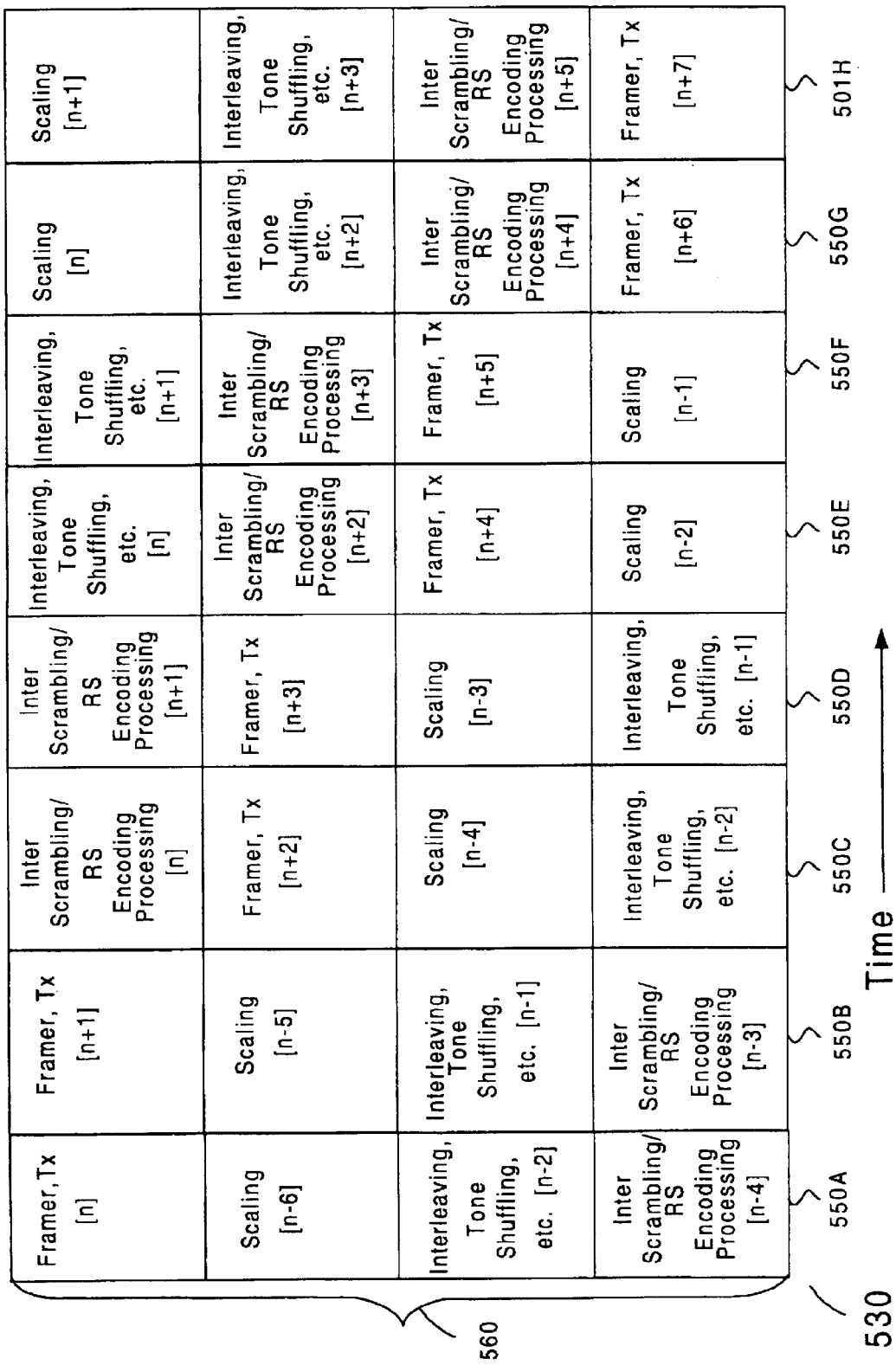
Fig. 5C  Timing of symbol tasks and their sequences on software side

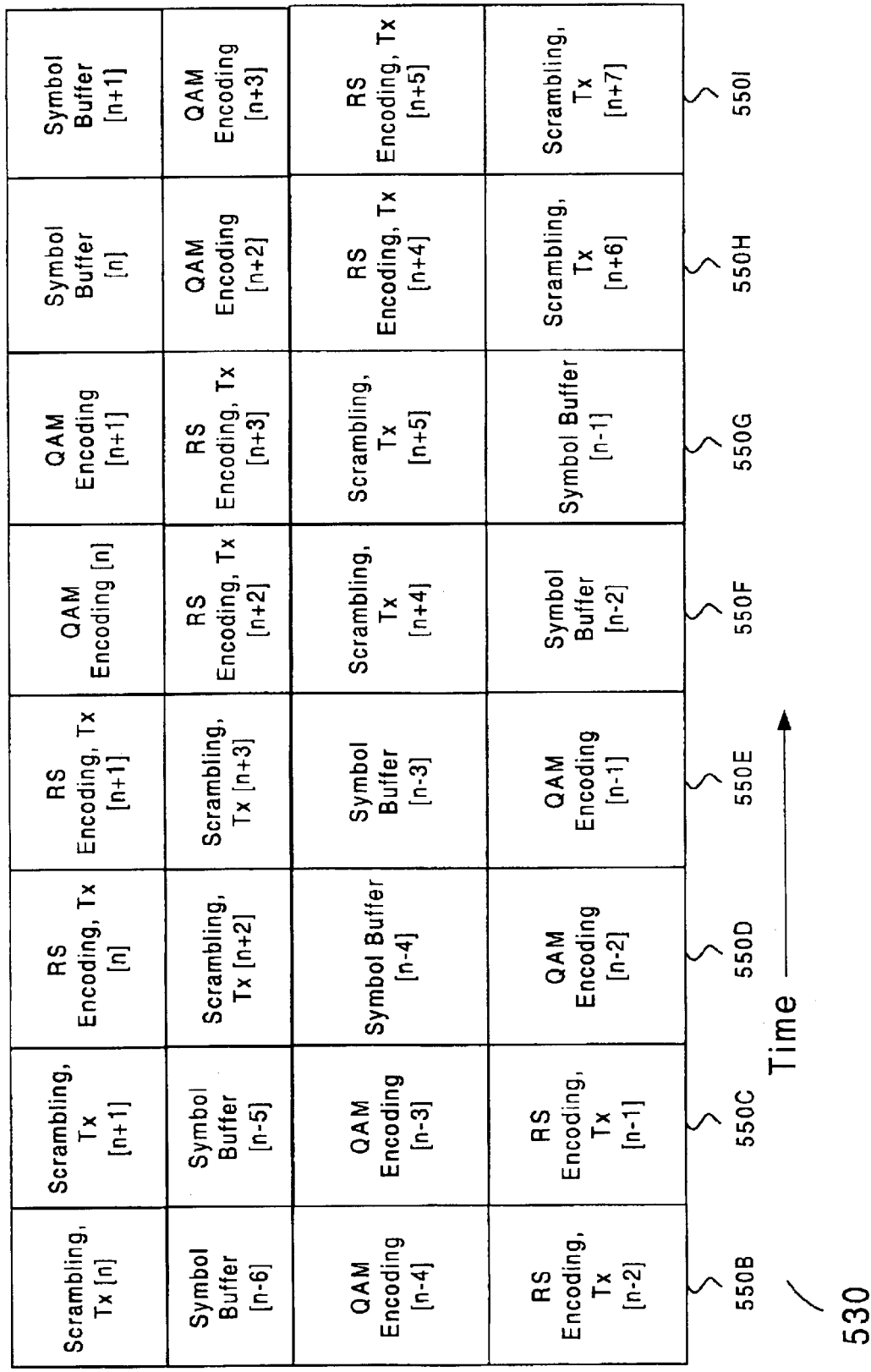
Fig. 5D  Timing of symbol tasks and their sequences on hardware side

Fig. 7A

| Location 701 | TST Entry Address 702 | Port 703 | Operation 704 | Remarks 705 |
|---|---|---|---|---|
| AABI+0 | Offset address pointing to TST | 0 | CRC/Scrambling | N is the number of ports. The same ASIC block is used for both transmission and receiving. For each port, two rounds are needed (to support dual latency) for each direction. Therefore, the total computation round is four times N. AABI = 0 |
| AABI+1 | | 1 | | |
| ... | | ... | | |
| AABI+N-1 | | N-1 | | |
| AABI+N | | N | CRC/Descrambling | |
| AABI+N+1 | | N+1 | | |
| ... | | ... | | |
| AABI+2N-1 | | 2N-1 | | |
| AABI+0 | | 0 | RS encoding | N is the number of ports. The same ASIC block is used for both transmission and receiving. For each port, two rounds are needed (to support dual latency) for each direction. Therefore, the total computation round is four times N. AABI = 1 |
| AABI+1 | | 1 | | |
| ... | | ... | | |
| AABI+N-1 | | N-1 | | |
| AABI+N | | N | RS decoding | |
| AABI+N+1 | | N+1 | | |
| ... | | ... | | |
| AABI+2N-1 | | 2N-1 | | |
| AABI+0 | | 0 | TCM encoding | AABI = 2 |
| AABI+1 | | 1 | | |
| ... | | ... | | |
| AABI+N-1 | | N-1 | | |
| AABI | | 0 | TCM decoding | AABI = 3 |
| AABI+1 | | 1 | | |
| ... | | ... | | |
| AABI+N-1 | | N-1 | | |
| AABI+0 | | 0 | Gain scaling | N is the number of ports. The same ASIC block is used for both transmission and receiving. For each port, two rounds are needed (to support dual latency) for each direction. Therefore, the total computation round is two times N. AABI = 4 |
| AABI+1 | | 1 | | |
| ... | | ... | | |
| AABI+N-1 | | N-1 | | |
| AABI+N | | N | FEQ | |
| AABI+N+1 | | N+1 | | |
| ... | | ... | | |
| AABI+2N-1 | | 2N-1 | | |
| AABI+0 | | 0 | ATM-TC | AABI = 5 The total number of transfer rounds is one plus twice of the number of ADSL ports (two rounds for each port to support dual latency), if there is additional ATM/SAR/AAL performed by software. |

| Input Data Block Size (12-bits) | Output Data Block Size (12-bits) | Port ID (6-bits) | Memory Location (1-bit) | Page (1-bit) |
|---|---|---|---|---|
| | | | | 702A |
| Start Address of Download Data Block (Input) | | | | 702B |
| Start Address of Upload Data Block (Output) | | | | 702C |

702

LOGICAL PIPELINE FOR DATA COMMUNICATIONS SYSTEM

CROSS REFERENCE TO RELATED APPLICATIONS

This application claims the benefit of U.S. Provisional No. 60/185,964 filed Mar. 1, 2000.

The present application is further related to the following applications, all of which are being filed contemporaneously herewith, and all of which are hereby incorporated by reference:

Scaleable Architecture for Multiple-Port, System-on-Chip ADSL Communications Systems; U.S. patent application Ser. No. 09/797,633;

System and Method for Internal Operation of Multiple-Port xDSL Communications Systems; U.S. patent application Ser. No. 09/797,789;

xDSL Communications Systems Using Shared/Multi-function Task Blocks; U.S. patent application Ser. No. 09/797,778;

Mixed Hardware/Software Architecture and Method for Processing xDSL Communications; U.S. patent application Ser. No. 09/797,793;

xDSL Symbol Processor & Method of Operating Same; U.S. patent application Ser. No. 09/798,133;

Data Object Architecture and Method for xDSL ASIC Processor; U.S. patent application Ser. No. 09/797,755;

Programmable Task Scheduler for use with multiport xDSL Processing System; U.S. patent application Ser. No. 09/797,648;

Physical Medium Dependent Sub-System with Shared Resources for Multiport xDSL system; U.S. patent application Ser. No. 09/798,113; and Transport Convergence Sub-System with Shared Resources for Multiport xDSL system; U.S. patent application Ser. No. 09/797,634.

FIELD OF THE INVENTION

The present inventions relate to pipeline architectures and operations, and more specifically to a logical processing system including a hybrid combination of interleaved software and hardware stages.

BACKGROUND

ADSL is being widely deployed around the world as a major broadband Internet access technology. As the number of ADSL subscribers and the demand for bandwidth rapidly increase, it is highly desirable to provide a multiple-port ADSL solution that has a high density, low power, low gate count, and can be incorporated in a single chip for both central-office (CO) side and customer premises (CPE) side applications.

To try to obtain these features in a communications transceiver, a designer typically looks at many trade-offs associated with using various approaches to signal processing. Several prior art techniques have involved using a digital signal processor (DSP), an application-specific integrated circuit (ASIC), or a field-programmable gate array (FPGA) to perform processing operations on the transceiver signal.

The DSP transceiver approach involves using a processor, either alone or in combination with a CPU, to execute microcode software in connection with the transceiver processing operations. This arrangement is used by Vitesse Semiconductor Corporation (see PCT WO 00/10297 and PCT WO 00/10281) in connection with their Network Processor product line, as well as Texas Instruments in their ADSL transceiver products (see "Programmable Implementations of xDSL Transceiver Systems", IEEE Communications Magazine, May 2000). Additionally, Logic Devices Inc. has an approach involving a DSP in connection with a CPU (see U.S. Pat. No. 5,524,244), and Cirrus Logic has a dual DSP approach (see U.S. Pat. No. 6,081,783). As expressed in these references, a DSP based transceiver has the advantage of being easily upgradeable and customizable because the instructions are implemented in software. The down side of this approach is that the DSP can require more power, more time, and more gates than a dedicated ASIC where the instructions are hardwired into the design. Furthermore, as one moves to a multiple port design, the benefits of high density, low power, and low gate count become even more important.

A transceiver design involving only ASIC components will necessarily require at least one distinct logic core for every operation contemplated, resulting in a large gate count, and a difficult and costly feature upgrade path. As an example, Hilevel Technologies' approach involves an ASIC comprised of an array of functional cores, only one of which is operable at any time (see U.S. Pat. No. 6,157,051). This approach involves a series of separate collections of gates that are permanently wired, and the functional units are not capable of interrelation or even simultaneously operation.

Other approaches have addressed the relatively low efficiency of software processing, and the relatively unchangeable functions of hardware processing, to arrive at an approach involving FPGAs. For example, see "Configurable Computing. A Survey of Systems and Software," (Northwestern University, Department of ECE, Technical Report 1999). Additional approaches that teach the use of FPGAs to strike a balance between the benefits of software (DSP) and hardware (ASIC) can be seen in Ricoh Corporation's U.S. Pat. No. 6,182,206 B1, as well as Intel Corporation's U.S. Pat. No. 5,768,598. All of these approaches involve significant flexibility and relatively low power. However, the FPGA approach typically results in an undesirable quantity of unused gates, and a relatively slow speed due to reconfiguration time and the inherent slowness of a software design.

What is needed is a design that can obtain the flexibility of a programmable solution as well as the speed and size benefits of a dedicated IC solution.

SUMMARY OF THE INVENTION

An object of the present invention, therefore, is to provide an improved multi-port system that is implementable using a minimized amount of computing resources, so as to reduce costs and increase integration density;

A further object of the present inventions is to provide an architecture for a multiport system that is scaleable to accommodate future technological needs;

Another object of the present inventions is to provide an architecture for a multiport system that is modifiable to accommodate future standards changes, a variety of different operating environments, and particular operational requirements that may be desired when such is used in field;

A further object of the present inventions is to provide an architecture for a multi-port system based on optimizing a gate/transistor count for any particular communications environment;

A related object of the present invention is to provide a design tool and operational methodology that evaluates and considers effective performances of various hardware and software based computing resources for a communications system;

Still another object of the present invention is to provide a system and method for operating a logical pipeline which is flexible and alterable;

A related object of the present invention is to provide a system and method for synthesizing a set of hardware and software computing circuits into a logical hybrid pipeline which is flexible and alterable;

Another object of the present invention is to provide a form of DMT symbol processor which is specifically adapted for processing DMT type instructions, so that an xDSL communications system can benefit from a specialized type of processor tailored to particular needs of such environments;

Another object of the present invention is to provide a unique type of ASIC based execution unit that includes some programmable features as well, so that it can be conveniently used as a building block for a logical/logical hybrid pipeline;

A related object of the present invention is to provide a unique type of ASIC based execution unit that is tailored for an xDSL environment, and is shareable both in time and across multiple ports so as to reduce hardware requirements;

Still another object of the present invention is to provide an improved xDSL communications system in which operations for multiple ports can be synchronized and performed simultaneously using a variety of closely coupled subsystems;

Yet another object of the present invention is to provide an improved xDSL system that is adapted to efficiently and flexibly implement a PMD layer and a TC layer in a fashion that supports a plurality of ATM and/or VoDSL based transmission;

A related object of the present invention is to provide a PMD subsystem that is shareable by a plurality of communications ports and adapted to interact efficiently with related pipeline stages in an xDSL communications system;

A related object of the present invention is to provide a TC subsystem that is shareable by a plurality of communications ports and implementeable with standard ASIC blocks in a pipeline arrangement;

A related object of the present invention is to provide a TC subsystem task scheduler that can coordinate data transfers intelligently between said subsystem and other elements of logical hybrid processing pipeline and a PMD subsystem;

Another object of the present invention is to provide a flexible mechanism for exchanging data results between different pipeline stages in a logical pipeline with a common data object used for both input and output, including between software and hardware in logical hybrid pipeline;

A related object is to provide a system and method for storing and retrieving data objects efficiently in an external or internal memor;

A related object is to provide a form of data object that can be used for passing control information around a logical pipeline so that individual stages can be configured dynamically for a particular data transmission;

Still another related object is to provide a communications system with local transfer busses so as to reduce bandwidth requirements for a data transmit/receive path;

Yet a further object of the present inventions is to provide an xDSL system that can operate a plurality of ports in a variety of modes, or with mixed modes, so that either ATU-C or ATU-R configurations can be used by ports in the system, thus enhancing the flexibility of the system for field applications;

Still a further object of the present invention is to provide a system for managing power consumption of an xDSL system;

A further object of the present inventions is to provide mechanisms and systems for allocating computing resources within an xDSL system as needed to support a particular communications mode;

Another object of the present inventions is to provide an architecture for a multiport system that will be achievable with a single SOC integrated circuit.

These and other related objects are achieved by the following aspects of the present invention.

A first aspect of the inventions covers a logical processing pipeline. The pipeline generally includes an input buffer for receiving digital data signals associated with a communications transmission transporting a data stream, the communications transmission requiring a set of predefined signal processing operations to extract the data stream from the digital data signals. A plurality of interconnected pipeline stages is adapted for performing processing operations associated with the set of predefined signal processing operations. In contrast to prior art fixed hardware schemes, a common pipeline memory is instead used for storing intermediate processing results for all of the plurality of interconnected pipeline stages. In this manner, each stage can be output directly to any other stage, so that the sequence and type of operations can be programmed as needed. An output buffer receives an output from the plurality of interconnected pipeline stages, the output corresponding to data in the data stream. The resources for the plurality of interconnected pipeline stages are scaleable so as to satisfy performance requirements of a communications protocol used for the communications transmission.

In another variation of the above, a logical hybrid pipeline is effectuated by using a mixture of logically interconnected first set of hardware based pipeline stages and a second set of software based pipeline stages. Again, a common pipeline memory for storing processing results from both the first set of hardware based pipeline stages and the second set of hardware set of pipeline stages is used. Processing of the data occurs in an interleaved manner, so that such that processing results are exchanged between the first set of hardware based pipeline stages and the second set of hardware set of pipeline stages during the pipeline clock period through the common pipeline memory. In other words, rather than a back-to-back configuration of separate fixed hardware and software pipelines, the present invention uses a mixture of logically connected stages, with any particular stage implemented in either software or hardware, and being able to receive an input/direct an output to a succeeding stage also implemented in hardware or software. This permits reorganization and configuration of the pipeline in a dynamic fashion to accommodate any changes in a transmission protocol, or rate requirements, etc. Furthermore the logical hybrid pipeline is modifiable to add or remove pipeline stages. As alluded to earlier, input and output to the first set of hardware based pipeline stages and the second set of software based pipeline stages is implemented in the form of a data object, the data object including both control parameters and computations results for a block of processed data. In the logical hybrid processing pipeline the common pipeline clock is used by one or more general purpose processors in the software pipeline stages as a program interrupt, and by the hardware stages as an initialization clock.

Other related aspects of the present inventions include various methods for operating the logical pipeline (or logical hybrid pipeline), its interaction with other system elements, and overall data and control flow through the receive and transmit paths.

Other aspects of the invention cover a discrete multi-tone (DMT) symbol processor for use in a multi-port xDSL communications system. The processor generally includes: a first buffer stage for receiving a plurality of DMT symbols to be processed in accordance with a predetermined set of operations so as to extract a plurality of data streams for a plurality of corresponding communications ports. A first set of hardware based execution units is configured to perform a first group of physical layer and/or a transport convergence layer related operations as part of the predetermined set of operations. A econd set of software based execution unitsis also configured to perform a second group of physical layer and/or a transport convergence layer operation as part of the predetermined set of operations. The first set of hardware based execution units and the second set of software based execution units are interconnected so as to perform all of the predetermined set of operations for all of the plurality of corresponding communications ports. Accordingly, a plurality of symbols for a plurality of different communications ports are processed simultaneously within the DMT symbol processor.

In a preferred approach, the DMT symbols include both receive and transmit symbols. A common clock used to initiate the predetermined set of operations by both the first set of hardware based execution units and the second set of software based execution units. The clock rate units is higher than that required by an xDSL communications protocol supported by the plurality of corresponding communication ports.

Further in a preferred approach, the above components can be arranged in a logical hybrid pipeline through a common memory used by the first set of hardware based execution units and the second set of software based execution units which is set up for exchanging data. This pipeline is superior to traditional physical pipelines, since a common memory, instead of separate intermediate buffers is used, and this allows easy addition/removal of a hardware and/or a software stage. Two separate pages are set up in the common memory for exchanging data, such that at any given time both first set of hardware based execution units and the second set of software based execution units receive input from a first page, and generate output to a second page. The first set of hardware based execution units and the second set of software based execution units are synchronized to the same memory pages such that one or more of the hardware based execution units can be added or dropped as needed to support modifications to the predetermined set of operations.

Further in a preferred approach, the first set of hardware based execution units are comprised of a plurality of application specific (ASIC) hardware blocks and the second set of software based execution units are comprised of a plurality of DSP cores executing a general purpose DSP instruction set. The ASIC hardware blocks are interconnected through a first bus that is separate from a second bus used by the plurality of DSP cores. Furthermore, the first set of hardware based execution units and/or the second set of software based execution units can by dynamically adjusted to accommodate a change in the predetermined set of operations, and/or a data rate requirement for the plurality of different communications ports.

Using these arrangements, time dependencies between successively received DMT symbols are eliminated for the communications transmission in an xDSL environment. In addition, computing resources for a physical medium dependent layer, a transport convergence layer and a microprocessor subsystem are allocated as required to support a computation requirement for the data transmission. The data stream can be a bit stream, a packet based stream, or a cell based stream. For the latter, the data stream is preferably based on transporting asynchronous transfer mode (ATM) cells over a digital subscriber loop (DSL). The system makes extremely efficient use of resources so that, for example, M separate pipeline stages can support n separate ports, such that when a number of distinct operations associated with the set of predefined signal processing operations for the DMT symbol is equal to N, then M<N*n.

A related variation includes a DMT instruction processor for processing a DMT based data transmission comprising. In such variations, a plurality of interconnected pipeline stage is used, each of the pipeline stages being adapted for executing a DMT related instruction, the DMT related instruction specifying a DMT related operation and at least one associated DMT related operand for processing a DMT symbol. At least one of the pipeline stages is implemented in hardware, and at least one other of the pipeline stages is implemented in software. The plurality of interconnected pipeline stages performs substantially all of the set of predefined signal processing operations to extract the data stream in hardware and software in an interleaved fashion.

A related aspect of the present inventions includes the methods for operating a DMT symbol processor, and particularly in the form of a logical pipeline (or logical hybrid pipeline).

A first aspect of the invention therefore provides for a multi-port communications system comprising a first subsystem for performing a first set of physical medium dependent operations on a data transmission; a second subsystem for performing a first set of transport convergence operations for the data transmission; and a third subsystem for performing a second set of physical medium dependent and/or a second set of transport convergence operations for the data transmission. Each of the first subsystem, the second subsystem and the third subsystem are useable and shareable by a plurality of communications ports maintaining a plurality of data transmissions in the multi-port communications system.

Another feature of this aspect of the invention includes the fact that the first subsystem, the second subsystem and the third subsystem are configurable so that any of the following operating modes are supportable by the multi-port communications system: (1) one-port ADSL-Transceiver-Unit-Remote (ATU-R), (2) one-port ATU-Central-Office (ATU-C), (3) two-port ATU-R, (4) two-port ATU-C, and (5) one-port ATU-C and one-port ATU-R. In an xDSL environment, upto N separate ports supporting a discrete multi-tone (DMT) based transmission in accordance with an xDSL standard can be supported using a number of transistors that is less than approximately N*700k. This system is preferably implemented on a single system-on-chip (SOC) integrated circuit.

Due to the flexible arrangement and interconnection of these subsystems, computing resources in the system can be allocated to each of the first subsystem, the second subsystem and the third subsystems as required to support a particular data transmission. For instance, additional stages can be added in to increase processing power. Thus, operations for receive tasks and/or transmit tasks for a plurality of ports in the system are also allocatable so as to optimize resource useage of the first subsystem, the second subsystem and the third subsystems, and/or to minimize power consumption.

The above aspect of the invention is preferably implemented so that the first subsystem, the second subsystem and the third subsystems are arranged as a single logical pipeline using a common pipeline clock. The common pipeline clock is operated at a rate higher than any rate used by any port in the system during a communicatoin with a remote transceiver. Because of this arrangement, processing operations for each port in the system are performed synchronously with respect to all other ports.

Further in a preferred implementation, the system can also support at least one port that is a voice over DSL (VoDSL) port.

In addition, the first subsystem is preferably coupled through a time domain multiplexed bus to an analog front end circuit, the time domain multiplexed bus including frames containing both data and embedded control information. Furthermore, the time domain multiplexed bus is at least n bits wide in each transmit/receive direction, where n>=2, and uses timing provided by both a frame clock and a separate bit clock carried between an xDSL interface and the codec. To support a required data rate and/or xDSL standard used by the system, the frame clock and/or the separate bit clock are programmable, and the data rate can be varied by adjusting a number of time slots occupied by data during a frame clock.

Another aspect of the invention includes a multi-port communications system similar to the above, so that the first subsystem preferably includes one or more PMD related application specific integrated circuits (ASICs), wherein at least one of the PMD related ASICs is configured to perform more than one PMD related function; the second is coupled to the first subsystem through a bus master, and includes one or more TC related application specific integrated circuits (ASICs), wherein at least one of the TC related ASICs is configured to perform more than one TC related function; and the third subsystem includes one or more signal processing cores. A bus master is adapted to transfer and receive processed data from a shared external memory for exchanging processing results between each of the first subsystem, the second subsystem and the third subsystem. In this arrangement, the first subsystem, the second subsystem and the third subsystem are again shared by a plurality of communications ports in the multi-port communications system to support a plurality of separate data transmissions occurring at the same time.

In a preferred approach for the above aspect of the invention, at least one of the PMD related ASICs and/or at least one of the TC related ASICs is configured to perform both a receive based operation and a transmit related operation during a single DMT symbol operating cycle. To further enhance flexibility of operations, a common data object structure is used for passing data and control information within and between each of the first subsystem, second subsystem and third subsystems.

Another aspect of the invention involves a multi-port communications system sharing many features of the above aspects of the invention, and further arranged in a logical pipeline arrangement using a common pipeline clock for a bus master, the first subsystem, the second subsystem and the third subsystem. Results between such stages are exchanged through a common external system memory so as to minimize hardware requirements.

In a preferred approach, the common pipeline clock is operated at a rate higher than any rate used by any port in the system during a communication with a remote transceiver. This allows processing operations for each port in the system to be performed synchronously with respect to all other ports. To accommodate the disparity in operating rates between operations inside and outside the pipeline, stuffing intervals are inserted into the logical pipeline for each port to accommodate the higher rate, during which stuffing intervals dummy data is exchanged between each of the first subsystem, the second subsystem and the third subsystem. In some instances control data is exchanged between one or more of the first subsystem, the second subsystem and the third subsystem during such stuffing intervals for adaptively changing processing elements in the pipeline stages.

In yet another preferred implementation, respective local busses are used by the subsystems to reduce bandwidth requirements of a common transfer bus used by the logical pipeline.

The logical pipeline uses a dual buffer structure for exchanging the processing results so that both hardware and software stages can be interleaved or interspersed. The logical pipeline is shared so that it handles both receive and transmit operations for the plurality of ports during a complete discrete multi-tone (DMT) symbol operating cycle.

Another aspect of the invention is associated with a multi-port communications system that employs a unique form of data object structure for passing data and control information to processing circuits within each of the first subsystem, second subsystem and third subsystems. In this fashion, the data object structure is used as a common mechanism for exchanging results of the processing circuits and between the first subsystem, second subsystem and third subsystems. The data object structure is used both as an input and an output mechanism for each pipeline processing stage implemented by the first subsystem, the second subsystem and the third subsystem.

The control information preferably includes information identifying a port associated with the data object structure, as well as a communications path associated whether the data object structure, including whether the data object structure is associated with a transmit operation or a receive operation. The control information also includes information specific to a processing block operating on the data object structure, including a specific processing mode to be used for the data object structure. Furthermore, the control information preferably includes operational and/or port specific parameters, such as a symbol count, a configuration value, etc., so that monitoring/testing/adaptive feedback can be generated by a first processing stage in the pipeline and passed through to a second processing stage, even if the first processing stage and the second processing stage are separated by mote than one other processing stage.

Another aspect of the present invention concerns the use of an xDSL capable multi-port communications system that specifically processes a data transmission based on discrete multi-tone (DMT) symbols. The system uses an xDSL protocol standard, including for example ADSL and/or VDSL and/or SHDSL, etc. In such instances, the common pipeline clock is based on a discrete multi-tone (DMT) symbol rate, and is adjustable to control power consumption in the system such as in instances where only limited resources from the pipeline are needed to handle a particular transmission.

Another aspect of the invention concerns a method of operating a multi-port communications system, in which a set of PMD and TC operations are performed by a combination of hardware/software so that a logical pipeline is created.

Still a further aspect of the invention includes a system for processing xDSL communications comprising a plurality of individual communications ports operating with a plurality of unique port sampling clock rates during a normal data transmission with a plurality of remote transceivers; and an xDSL signal processing circuit for performing signal processing operations for all of the plurality of individual communication ports, the xDSL signal processing circuit operating with an internal clock rate that is higher than any of the plurality of unique port clock sampling rates. That is a nominal target clock rate frequency for the associated port sampling clock rate is approximately 4 kHz, and the internal clock rate is approximately 4 kHz*(N/N−X) where N<=69 and X>=2.

The xDSL signal processing circuit is preferably comprised of a logical pipeline with a plurality of individual stages, such that the plurality of individual stages each perform an DMT symbol related operation. In such arrangements, a pipeline clock operates at a rate equal to the first DMT symbol rate multiplied by a constant greater than one, so that the pipeline operates at a rate faster than the first DMT symbol rate T. Because the pipeline clock is higher than any of the plurality of port rates, a plurality of individual communications ports can be processed in a synchronous manner. In addition, the pipeline is coupled to an analog front end circuit coder/decoder (CODEC) and the CODEC operates with a CODEC clock using a CODEC clock rate substantially higher than the pipeline clock rate. Further to reduce power consumption, the pipeline clock can be disabled and/or modified independently of the CODEC clock.

Furthermore, due to the handshaking requirements imposed by various xDSL protocols, each communication port of the plurality of individual communications ports is adapted to communicate using a first clock rate during initialization of a normal data transmission and using a second clock rate during a normal data transmission, where the second clock rate is greater than the first clock rate. Again, in an xDSL application, this means that the DMT symbol rate in the channel is reduced during part of an initialization period before the data transmission begins. Because of this, a "stuffing" time interval occurs in the pipeline. During such intervals the processing pipeline processes a number of dummy DMT symbols. That is to say, substantive processing operations for one or more of the individual communication ports are skipped. The data objects for such dummy DMT symbols are signaled through the use of indicator bits.

A related aspect of the present inventions includes the methods for operating a multi-tasking, multi-port communications system of the type described above with a modified clock rate, and in particular those systems that use some form of logical pipeline (or logical hybrid pipeline).

Still a further aspect of the invention concerns a system for managing power dissipation of a communications transceiver. This system includes one or more communications ports that are each coupled to a respective communications channel and that are each configured to support a data transmission based on one or more communication modes, each of the one or more communications modes requiring an associated amount of computing resources from the system to maintain. A signal processing circuit is provided for performing signal processing operations for the one or more communication ports, the signal processing circuit operating with a programmable clock which is adjustable based on which of the one or more communication modes is used for the data transmission. In this way, power consumption by the system can be managed by adjusting the programmable clock in response to a selected one of the one or more communication modes used during the data transmission.

In another variation, the programmable clock is adjustable based on a determination by the system of selectable computing resources within the system to be used as the variable amount of computing resources required to maintain the data transmission. In such systems, the programmable clock can be disabled and/or frequency reduced for the hardware based functional task blocks when the one or more communications ports is idle and/or only requires an amount of computing resources supportable by the separate software based functional task blocks alone, and/or in response to a number of tones used.

In a preferred approach, the one or more communication modes consist of one or more xDSL based communications standards utilizing one or more different numbers of DMT symbols for receive and/or transmit data paths.

A related aspect of the present inventions includes the methods for controlling power dissipation in a logical pipeline (or logical hybrid pipeline) using some form of clock control.

A further aspect of the invention concerns a communications system including a digital data buffer circuit for storing digital data, the digital data including both receive data and transmit data; and a shared signal processing circuit for performing a set of signal processing operations on both the receive data and the transmit data, the shared signal processing circuit having computing resources shared by a receive task and a transmit task; and the computing resources including a set of independent application specific (ASIC) logic circuits interconnected by a local bus and using a common clock, the set of independent ASIC logic circuits including at least one multi-tasking ASIC logic circuit, and which multi-tasking ASIC logic circuit during a single period of the common clock selectively performs either a first signal processing operation on the receive data and/or a second signal processing operation on the transmit data.

In a preferred approach, the multi-tasking ASIC logic circuits performs the first or second signal operation in response to a control parameter generated for the digital data. The shared signal processing circuit thus performs a set of signal processing operations for a plurality of independent communication ports in the system.

The signal processing operations are preferably associated with a digital subcriber loop (DSL) based communications transmission. In such cases, the multi-tasking ASIC logic circuit thus performs either a transport convergence transmit related operation or a transport convergence receive related operation on a DMT based symbol associated with the port-specific digital data, and for multiple ports. At least one of the ports communicates Voice over DSL (VODSL) based data. Furthermore, the receive task and the transmit task require differing amounts of the computing resources.

In an DSL environment, a multi-tasking ASIC logic circuit performs at least two signal processing operations, such that during a during a single period of the common clock the multi-tasking ASIC logic circuit is selectively controlled to perform either a first type of signal processing operation on a receive DMT symbol or a second type of signal processing operation on transmit DMT symbol. During any single period of the common clock the set of ASIC logic circuits is simultaneously processing a plurality of DMT symbols for the plurality of communications ports.

Further in a preferred approach, the shared signal processing circuit further includes a general purpose programmable processor executing software instructions to perform signal processing operations on the receive DMT symbols and transmit DMT symbols, and they system forms part of a logical hybrid pipeline. The general purpose programmable processor includes a number of separate digital signal processing cores.

A related aspect of the present inventions includes the methods for operating a shared set of resources, and particularly within some form of logical pipeline (or logical hybrid pipeline).

Yet another aspect of the present invention is directed to a method and system for implementing a scaleable architecture for a communications system based on minimizing a total gate count for the communications system after considering the operational requirements of the system as may be needed to comply with various standard protocols i.e. for ADSL, SDSL, VDSL, etc.. The method generally comprises the following steps: dividing a communications transmission process into a set of N individual transmission tasks (T1, T2, . . . TN); determining a computational complexity (M1, M2, . . . MN) for each of the N individual transmission tasks respectively, the computational complexity being based on a number of instructions per second (MIPs) required by a computational circuit to perform each of the N individual transmission tasks; determining a number of gates and/or transistors required to implement each of the N individual transmission tasks using a hardware based computing circuit; and determining a number of gates and/or transistors required to implement each of the N individual transmission tasks using a software based computing circuit; and determing a first effective number of MIPs per gate and/or transistor achievable with the hardware based computing circuit (i.e., an ASIC usually) when performing each of the N individual transmission tasks; and determining a second effective number of MIPs per gate and/or transistor achievable with the software based computing circuit (i.e., a general purpose programmable processor such as DSP) and allocating X individual transmission tasks to the software based computing circuit, where 1>=X>N, so that the X individual transmission tasks are performed in software; allocating all remaining N–X individual transmission tasks to the hardware based computing circuit so that the N–X individual transmission tasks are performed using dedicated hardware logic. Steps (g) and (h) are performed by comparing the first effective number of MIPs with the second effective number of MIPs.

The aforementioned steps can be used by designers and circuit emulators, for example, during development of an architecture for a logical hybrid processing pipeline. Alternatively, these steps can be performed in the field by a communications session to dynamically configure resources for a data transmission in the communications system.

In the preferred approach, a time factor corresponding to a number of times the hardware based computing circuit is used during a transmission period is also considered to scale the effective number of MIPs achievable by an ASIC block implementing the dedicated hardware logic. The time sharing factor is thus related to a number of independent ports that use the ASIC during a single transmission period, and/or a number of distinct operations that the ASIC performs during a single transmission period for a port.

In a related variation, the N individual transmission tasks are allocated to an optimal subset of one or more of the set of P computational circuits (C1, C2 . . . CP) based on a consideration of reducing a total gate or transistor count used for performing the communications transmission process, and such that at least one hardware based computing resource and at least one software based resource are selected from the set of P computational circuits to construct/operate a logical hybrid pipeline. Again, in a preferred approach, a logical hybrid pipeline effectuates the communications transmission process by interleaving and overlapping execution of N individual tasks between the hardwired logic stages and software based stages.

The evaluation is preferably performed for a system that includes a plurality of communications ports that share the optimal subset for performing a transmission process and a receive process. In this manner, it is typically the case that an optimal subset is implemented with a total gate or transistor count of less than approximately 1 million per port, and this facilitates a system-on-a-chip (SOC) integrated circuit implementation for the entire communication system, which can include signal processing operations for both a physical medium dependent layer and a transport convergence layer.

In another approach, the preferred methodology allocates the execution tasks by specifying a first set of tasks for execution by the ASIC for those where the ASIC has a first task performance rating measured in effective MIPs per gate or transistor exceeding a second task performance rating achievable by the DSP for each task in the first set of tasks.

In another variation, a communications system with both hardware and software based resources can operate either in a first mode where both a ASIC and DSP are used to perform the N separate tasks for one or more communication port, and in a second mode where only the DSP is used to perform the N separate tasks. The mode is selectable based on utilization of available processing resources in the communications system by communication ports other than the first communication port. In the second mode power savings can be achieved by shutting off power selectively to the ASIC, by reducing a clock rate, etc.

Further in a preferred approach, the ASIC and the DSP ultimately selected require a total number of gates and/or transistors on single SOC that is less than that which would be required by one or more DSPs to perform the first set and second set of tasks. This feature ensures that the overall cost of the inventive solution will always be less than a DSP only based solution.

A communications system implemented with the above design methodologies is more cost effective, less power consuming, and more flexible than pure ASIC or pure DSP solutions. The only additional hardware required is an external memory, and this can be conveniently shared with other host processing resources to further reduce costs.

Yet another aspect of the present inventions concerns the structure and operation of an application-specific integrated circuit block (ASIC) that is used, for example, in the aforementioned TC and PMD subsystems. The ASIC includes generally: an input data decoder block for decoding an input data object comprised of a plurality of input data object parameters and input data; and a computation logic block for performing application specific computations in connection with the input data object; an output data encoder block for encoding an output data object based on the application specific computations; an input/output buffer block for storing the input data for subsequent computation processing in connection with the plurality of input data object parameters; a computation sequence register for storing information associated with the one or more of a plurality of simultaneously active communications system ports; and transfer request means for requesting the transfer of the input data object and/or the output data object.

The ASIC is thus adapted for performing the application specific computations in connection with any one one or more of a plurality of simultaneously active communications system ports, and for both a receive direction and a transmit direction of an active communications system port. In other words, it is multi-tasking such that within a complete processing period, it can perform a number of different operations for a number of different ports, and the particular operation for a particular clock interval can be specified/programmed in a desired sequence. The activity of the ASIC, including which operation it will perform, for which port, and other configuration details can be specified within the data object with various input data object parameters. Similar control information for processing operations by subsequent ASICs in the logical pipeline (or software operating blocks in a logical hybrid pipeline) can be created and encoded into an output data object by the ASIC. In a preferred approach, the ASIC contains specific hardware logic implementing an operation required to support an xDSL transmission based on DMT symbols.

A related aspect of the present inventions includes the methods for operating a multi-tasking, multi-port ASIC of the type described above and in particular those systems that are used in some form of logical pipeline (or logical hybrid pipeline).

Yet another aspect of the present invention relates to implementation details for the data objects mentioned above, which as noted provide a new type of data exchange mechanism for use in a pipelined communication system. In a preferred approach, the data object includes a first portion containing data relating to one or more of a plurality of parameters associated with the control and/or the configuration of one or more processing circuitry blocks (which acts a type of rudimentary "instruction" to an ASIC processing block); and a second portion containing data associated with computations performed by said one or more processing circuitry blocks (i.e., a type of operand).

With this format, data exchanges between a successive set of pipeline stages can be flexibly controlled, and a logical pipeline can be effectuated by dual buffering data objects through a common memory. In other words, each particular pipeline stage reads from and writes to an input data object and an output data object respectively in two different pages in the common memory. This allows both hardware and software based computing circuits to be combined as well into a form of logical hybrid pipeline, and further permits exchanges with subsystems outside the pipeline (i.e., such as PMD subsystem) as may be required.

In a preferred approach, the parameters include such details as a port ID, general processing circuitry configuration details (for example, whether the data is associated with a fast or slow path), instructions indicating a transmission direction (receive/transmit), control information passed on by earlier pipeline stages, and other operational/management details (for instance in an xDSL environment, a DMT symbol sequence number). The data objects thus provide a mechanism for controlling and configuring pipeline stages in an adaptive fashion.

A related aspect of the present inventions includes the methods for creating, moving and using the data objects in a multi-tasking, multi-port communications system, and in particular those systems that use some form of logical pipeline (or logical hybrid pipeline).

Another aspect of the inventions covers the particular implementation for the scheduling circuit used within the TC subsystem. As described above, the TC scheduling circuit generally includes a data object queue for storing input/output data objects, a data object loader, a programmable state machine for interpreting the data object requests, and a bus master engine for retrieving/storing the various data objects received and output by the TC subsystem computing machines (i.e., ASICs). The data object queue interfaces with processing blocks issuing upload and download requests based on a predetermine sequence of operations necessary to be implemented in the TC subsystem.

The state machine is adapted to set up and interacts with one or more offset address tables in an address table memory to obtain memory address information associated with the data objects so that they can be retrieved from a local or external memory. The structure of the offset address tables is programmable, and the entries therein are based on a combination of parameters such as an ASIC block ID within the TC subsystem and a number of computations performed by the ASIC block within a processing period. In this fashion, a collective group of ASIC blocks can be set up through program control to perform multiple processing operations (i.e., both a CRC function and a Scrambling function) for multiple ports in a pipelined fashion.

In a preferred approach, a second transfer request can occur during the same clock period in which a first data object is being transferred for use by one of the TC subsystem ASICs, or a computing block external to the TC subsystem (i.e., such as a software pipeline stage). Furthermore, the transfer requests are handled with a programmable priority from the various subsystem computing machines.

Yet another aspect of the invention is directed to the structure and operation of the physical medium dependent (PMD) transport subsystem. As with the TC subsystem, a PMD scheduler coordinates data transfers involving data objects, in response to upload and download requests issued by computing blocks within the PMD subsystem. Despite the fact that PMD subsystem is not part of a pipeline structure, it nonetheless uses an architecture that benefits from the common data object structure. In this manner, therefore it can operate efficiently and exchange data through the common external memory with the components of the logical hybrid pipeline. Furthermore the PMD also includes mult-tasking components so that in a preferred approach, an IFFT/FTT block and a TEQ block implemented in ASIC form can be shared by multiple ports to save on hardware costs.

In addition the PMD transport subsystem preferably receives data from a front end analog circuit through a DSL link bus which uses a plurality of data lines, a word clock line, and a bit clock line. This DSL Link uses a protocol specifying embedded operations control information transfers between one or more analog front ends and the PMD transport subsystem.

Further in a preferred approach, the PMD subsystem is used in an xDSL based communication system, in which a stream of communications data contains discrete multi tone (DMT) symbols which transport asynchronous transfer mode (ATM) packets.

Another aspect of the present inventions concerns a transport convergence (TC) subsystem and its operation within a communication system. The TC subsystem forms part of a logical hybrid pipeline (interleaved hardware and software stages with a common memory) and in some instances can itself be implemented in the form of a logical pipeline (ASIC blocks with interleaved operations using a common memory). In the TC subsystem, data objects in machine readable form are transferred across a local bus between TC subsystem computing machines and a TC data object memory. The data objects preferably consist of a structure incorporating a parameter portion and a data portion.

A TC scheduling circuit controls the transfer of the machine readable object to and from a local memory and/or an external data object memory acting as the TC data object memory. At least two TC signal processing circuits are coupled to the local bus and the TC scheduling circuit, such that a first TC signal processing circuit preferably an ASIC) performs a first type of computation on a data object in connection with a stream of communications data; and a second TC signal processing circuit (also preferably an ASIC) performs a second type of computation on a data object in connection with a stream of communications data. The first type of computation and the second type of computation are different TC type operations, such as RS encoding, Scrambling, etc, and are usually for different ports. The computations are controlled in part by parameter information provided in the parameter portion of the data objects.

The TC control scheduling circuitry is adapted for providing data objects to another subsystem (i.e., such as an ATM TC layer) through the external data object memory as part of a logical hybrid pipeline processor consisting of the TC subsystem and a set of software based signal processing circuits implementing the additional TC layer. The TC control scheduling circuit responds to timing data information presented in the data objects from the TC computation circuits to schedule uploading and downloading data objects from the TC data object memory.

In one variation, the stream of communications data contains ATM packets carried over xDSL based discrete multi tone (DMI) symbols.

The parameter portion of the data objects contain stream information associated with a port ID, and/or transmit or receive directionality of the stream of communications data, thus permitting the TC computation circuits to perform both types of operations simultaneously, or with a single TC computation block, which is preferably an ASIC.

The arrangement and operation of the TC subsystem permit a functionality of the communications system to be modified as needed by adding or removing ASIC computation blocks used for communications transmission. This is due to the fact that the various computing blocks are arranged in a flexible pipeline whose behavior can be programmed through the data objects and the TC control scheduling circuit. The ASIC blocks can be supplemented if need through other forms of hardware logic, including FPGAs if an application justifies such additional cost. Still another aspect of the invention covers various methods used by the TC control scheduling circuit, the TC subsystem, and their interactions with other subsystems in the communications system. These include, among other things, specific operations used to set up loading and timing for the TC subsystem signal processing circuits, and other operations associated with responding to upload/download requests for particular data objects.

Thus, in this disclosure, a scaleable, a multiple-port architecture is described that has the following characteristics/benefits:

1. The same architecture for a varying number of ADSL ports. This minimizes the effort in re-engineering for a different port design.
2. Minimal transistors count per port. Compared to a typical ASIC design, this new architecture reduces the required transistors count from 6 M per port to less than 1 M per port. This minimal count design results in a tremendous cost, power, and space saving.
3. Programmable design that allows different ADSL implementations in different regions and future standards.
4. Power management to reduce the total power dissipation as the ADSL line rate decreases. This is a very important feature for central-office applications.
5. Configurable operations. For example, with the scalable architecture, a single 2-port ADSL chip solution can be configured as (1) one-port ADSL-Transceiver-Unit-Remote (ATU-R), (2) one-port ATU-Central-Office (ATU-C), (3) two-port ATU-R, (4) two-port ATU-C, and (5) one-port ATU-C and one-port ATU-R. The last one can be used as a single chip solution for ADSL repeaters. Similarly, another single chip can be configured as 2, 4, 8, or 16-port ATU-C.
6. Standalone system-on-chip design. This provides the easiest way for system integration. There is no dependence on other processors. Standard interfaces such as Utopia are provided for the external requirements.
7. System integration in a single chip. With a minimal transistor count design, it also allows for single-chip design with other system function such as voice over DSL (VoDSL), IP packet routing, and ATM cell switching.

DESCRIPTION OF THE DRAWINGS

FIGS. 2A and 2B are tables of estimated million instructions per second (MIPS) performance for DSP implementation and estimated gate counts for ASIC implementation of computation blocks in an ADSL transmitter/receiver system of the present invention. These data are particularly useful for consideration when determining an actual physical implementation/operation of the preferred embodiment of FIG. 1;

FIG. 3A is a table providing the material aspects of an embodiment of a general data object structure of the present invention, and which is particularly suitable for the embodiment of FIG. 1;

FIG. 3B is a table providing the material aspects of a preferred embodiment of a specific data object structure of the present invention usable with both a digital scrambler and a CRC Input/Output ASIC, and which is also particularly suitable for the embodiment of FIG. 1;

FIG. 5A illustrates the timing used by a logical pipeline for processing ADSL data described herein;

FIG. 5C depicts ADSL pipeline operations performed by a collection software task blocks for a sequence of ADSL symbols;

FIG. 5D depicts ADSL pipeline operations performed by a collection of hardware task blocks for a sequence of ADSL symbols;

FIGS. 7A and 7B are tables providing the material aspects of a preferred embodiment of a entries set up and used by a task scheduling structure of the present invention which is also particularly suitable for the embodiments of FIGS. 1 and 6.

DETAILED DESCRIPTION

I. Pertinent Parameters For xDSL Systems

Figure 1:
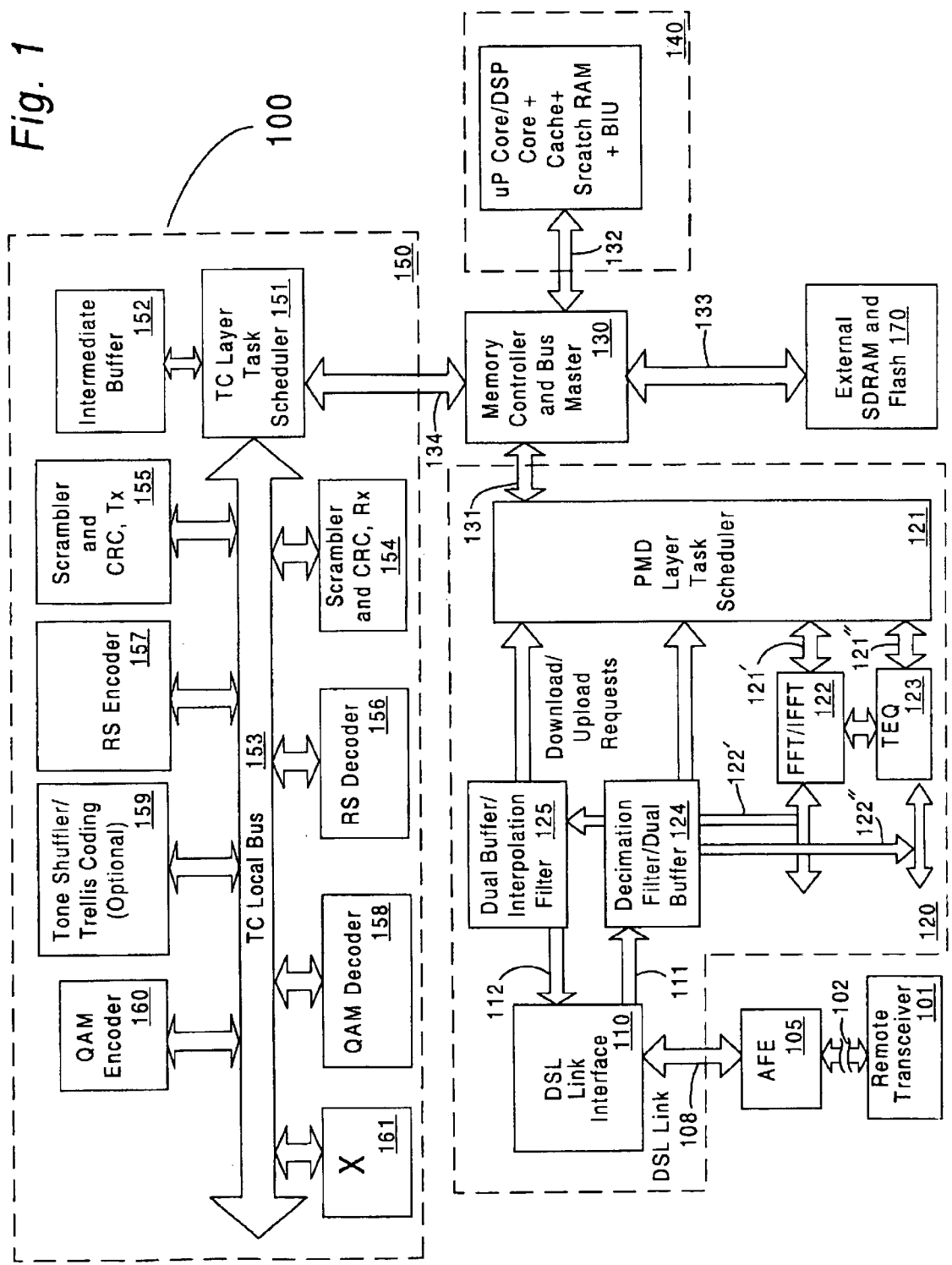
FIG. 1 is an electrical block diagram illustrating a preferred embodiment of a multiport communications system implemented in accordance with the teachings of the present invention.

Before the structure of the present invention is explained in detail, it is useful to first analyze some of the pertinent parameters associated with current xDSL technologies so that the benefits of the present approach are better appreciated.

1. Basic Architecture Features and Limitations: There are different known methods to implement ADSL functions: ASIC based, DSP based, and pure software based. The applicant has characterized and quantified the desirability and/or usefulness of using one or the other approaches to determine which is more applicable for any particular xDSL multi-port environment.
2. Expandability and Flexibility: ADSL is but a single flavor of xDSL technologies, and each is subject to rapid changes and standards upgrades. Another factor to be considered, therefore, is whether a particular ASIC or hardware approach has sufficient flexibility to accommodate such expected future innovations and expansions.
3. Power and Scalability: For any given approach, whether DSP or software, the MIPS requirement must be minimized, and the port size must be flexibly scaleable with a minimum transistor count. For example, a full-rate ADSL implementation will typically require 400 MIPS. A 16-port solution will thus require 6400 MIPS, which is impractical for any single DSP, and is incompatible with power dissipation and similar cost issues.

Summary of General Features of the Present Inventions

From examining the above considerations, therefore, the applicant has arrived at a number of innovations that are incorporated in the new scalable architecture, logical pipeline and subsystems described herein. These innovations and other general features are summarized here and will be explained in detail in the rest of the application. It will be apparent to those skilled in the art that this is not an exhaustive list of the benefits/features of the present invention, and that not every embodiment of the present invention will necessarily include all of such benefits/features.

1. Optimized Division of Functional Blocks. An important aspect of the present invention is that an intelligent and careful division of the necessary functional elements within a multi-port ADSL system into component ADSL blocks is performed, so such ADSL blocks that can be well understood and characterized in quantitative terms, and implemented in flexible fashion as noted below;
2. EMPG for each block. A parameter called "Effective MIPS per ASIC Gate Count (EMPG)" (sometimes referred to also as EMKG for Effective MIPS per 1000 (K) ASIC Gate Count) or represents an extremely useful aspect of the inventions for understanding the advantages conferred by the embodiments of the present disclosure. With this metric, devised by the applicant, it is possible to determine if it is more efficient to implement a given ADSL block in either ASIC or DSP from a gate count consideration. For example,
   (1) an FFT block of 50 k gates provides an effective 90 MIPS computation at 512 points, this yielding an EMKG of 1.8;
   (2) an Reed-Solomon decoder of 50 k gates for ATU-R provides an effective 200 MIPS, this yielding an EMKG of 4; and
   (3) a DSP core of 75 k gate (not including cache) at 100 Effective MIPS, this yielding an EMKG=1.1.

Therefore, and as discussed in more detail below, it will be more gate-count efficient to implement an ADSL block in ASIC form if its EMPG is larger than that of an available DSP core, for any given operation that must be implemented within the multiport system. With gate count efficiency optimized, the overall gate count is minimized for any particular system design requirement. While in the present context this approach is disclosed for an ADSL system, it is apparent that this aspect of the invention could be extended to any number of complex systems requiring many different and/or distinct operational blocks that can be implemented in either software and/or hardware form, whether it is voice recognition systems, PDAs, portable computing devices, etc.

3. Time-sharing a single ASIC block across multiple ports. Another significant aspect of the present invention is realized by the following heretofore unexploited discovery: namely, that many ASIC functional blocks do not need to spend an entire DMT symbol interval to complete an associated ADSL task. In fact, they may only spend a small fraction of time. For example, QAM decoding of 256 tones, a necessary operation during an ADSL communication session, may require only 1024 clock cycles. At 100 MHz, this will require only 10 $\mu$sec, which is a small fraction of the 250 $\mu$sec DMT symbol duration. Therefore, in many instances, the same ASIC block can be shared by multiple ADSL ports.

As a result, the EMKG of an ASIC block may be higher than otherwise expected or evaluated by conventional analysis, because it can be multiplied in some instances by a time sharing factor Tf, resulting in a net EMKG proportional to Tf*EMKG. Again, the applicant believes that this principle can be easily and beneficially extended by skilled artisans to other environments other than xDSL applications.

4. Time sharing the same ASIC block for both transmission and receiving directions of a given ADSL port. Many ADSL blocks can be easily configured to perform either encoding or decoding functions. For example, the same block can be configured to perform either FFT or IFFT operations. Similarly, CRC and scrambling in ADSL are operations that are performed commonly in both transmit and receive directions. Many other blocks, such as QAM and Reed-Solomon coding can be easily designed/adapted to support both encoding and decoding operations with minimum overhead. Thus, in many instances, it is possible to consolidate and/or intelligently combine tasks in a manner that allows the same kind of functional block to be used for more than one operation.

Another aspect of the present inventions, therefore, is that flexibility in an ASIC block is provided to perform both receive and transmit direction functions, which yields a significant improvement in the EMKG of an ASIC block. In rough terms it can be seen to be approximately equivalent in value to a net gain in MIPS realized by the eliminated ASIC block function, minus some offset resulting from the time sharing factor that could otherwise be used for such ASIC block if it were dedicated to a single function by multiple ports.

For any given design therefore, based on the nature of the receive/transmit blocks, the ability to time-share functions across multiple ports, and the ability to implement a block to perform both transmit/receive operations, an optimal design can be configured in accordance with the present teachings based on variable MIPS constraint (i.e., such as a minimum number of MIPS required to implement a single/multi-port ADSL transmission system) and/or a variable gate count (i.e., such as a maximum gate count supported by a particular chip die size).

5. Data Objects. Yet another significant aspect of the present inventions includes the use of Data Objects. The concept of Data Objects is introduced herein as an entirely new entity for use within a multi-port environment to help achieve the functionality noted earlier, such as time-sharing. An embodiment of a data object used within an ADSL environment includes the data itself, and control and configuration information, which are processable by a time sharing ASIC block. By processing data in data object format, each ASIC block can be considered as a software routine with maximum programmability. In the case of multiple ADSL port operation, for example, each port has a different configuration and control. An ASIC block can thus dynamically meet the requirement of each port by examining the control and configuration information in the data object and processing the much in the same way a software routine would be passed various operational variables.

6. Data Object Sequence Numbers. Another aspect of the present inventions covers the fact that each Data Object includes a sequence number. With this feature, an ASIC block can dynamically process data for a given port in a specified way. For example, software can control and specify that an IFFT ASIC block yielding an IFFT output should start adding a cyclic prefix for DMT symbols starting at sequence number 100. As a result, the IFFT ASIC Block will check the sequence number of each symbol and start adding the cyclic prefix once it detects symbol 100. This characteristic of the present invention allows precise ASIC operation when there is asynchronous latency from the operating system, a common phenomenon in real world applications.

7. Logical/Hybrid Pipelining. Logical pipelining represents another aspect of the present inventions that can employed with great effectiveness in a multi-port xDSL application. Compared to physical pipelining where different hardware blocks follow one another and exchange data at fixed timings through a buffer interface, a logical pipeline uses a single shared memory for multiple stages to exchange data. That is, there is no fixed "physical structure" to support a pipeline operation, and various pipeline stages can added or removed as necessary to change the functionality of the pipeline. Furthermore, the present invention also sets forth embodiments of a logical hybrid pipeline, in which hardware pipeline stages are interspersed (interleaved) between software pipeline stages. This permits a flexible interconnected hardware/software infrastructure consisting of a bus, task scheduler, a microprocessor, a data memory, and the aforementioned data object structure is used to provide a "logical hybrid pipeline" structure. The operation of this pipeline is discussed in more detail below.

8. Symbol stuffing. A further aspect of the invention is the use of what are referred to herein as "stuffed" symbols. Together with the logical hybrid pipelining features, synchronous pipelining operation can be used for multiple ADSL ports that operate on different timings, frequencies, and states (handshaking, data mode, idle, etc.). Stuffed symbols are used to accommodate the asynchronousness inherent in such operations.

9. ASIC blocks as programmable parallel co-processors. To maximize software programmability, ADSL functional blocks are implemented as coprocessors with maximum programmability. The control and data flow software forms a data object and uses it as an input to an ASIC block along with operational control information in the form of the control/configuration information. The output of ASIC block is also constructed as another data object. To some extent, this aspect of the invention can be considered as providing a kind of customized instruction set (i.e., the control and configuration information represents an operator, and the data an operand) so that a system/microprocessor can have ADSL specific instructions to perform ADSL operations.

10. Hardware-based, programmable task scheduling. From the above discussion, it is apparent that there is close interaction between ASIC blocks and software. To minimize the overhead on software and to support asynchronous operations for multiple ADSL ports, a hardware-based programmable task scheduler is used as another feature of the inventions. This can be programmed in conventional fashion to perform data transfer between the memory and a given ASIC block and to start the ASIC task at such block with proper timings.

11. Local bus and local memory for minimizing bandwidth requirements. A system-on-chip embodiment of the inventions can be partitioned into different functional subsystems, with each having its own local bus. As a result, data transfer for blocks within the same subsystem can be performed within an appropriate local bus.

12. Memory consolidation. Many memory blocks can be consolidated to minimize total buffer size requirement. For example, an interleaving buffer for RS encoding/decoding can be removed and integrated with the system memory.

13. Power management through programmable system clocks. Another aspect of the invention is that based on current settings (rates, number of active ports, etc.), the system can operate at a minimal clock to minimize power dissipation. That is, based on a scalable tone processing approach, an example of which is disclosed in applicants' issued U.S. Pat. No. 6,092,122 incorporated by reference herein, only a minimal set of tones is processed at a given rate. Therefore, overall processing power requirements can be minimized.

14. Built-in VoDSL port through ATM layer processing. With the present architecture, and an ATM layer processing including ATM, SAR, and AAL2, ATM cells carried by the ADSL layer can be framed into TDM format and connected to the external TDM interface. As a result, it can be used for direct PSTN switching interface.

Using the above innovations, the applicant projects that an ASIC transistor count per ADSL port can be significantly reduced down to 1 million transistors per port, compared to 6 to 7 million transistors per port in a typical ASIC design.

This number allows a practical and cost-effective 16-port design in a single conventional 0.18 µm based chip design.

II. Description of Architecture of a Preferred Embodiment

A block diagram of the hardware elements used in a preferred multi-port embodiment of the present system is shown in FIG. 1. It will be understood by those skilled in the art that some non-material aspects of the system shown in FIG. 1 have been simplified and/or omitted in order to better explain the scope of the present invention. Furthermore, while aspects of the present invention are explained by reference to such preferred embodiment and other specific architectural implementation details, the scope of the present invention is by no means limited to any embodiments and details discussed herein, and many other variations, additions, modifications, etc. will be apparent to those skilled in the art from the present disclosure.

A scalable architecture system 100 as described herein includes three major subsystems: (1) PMD 120 (2) TC 150 and (3) microprocessor/DSP 140. The first two subsystems consist of ASIC modules to perform part of the ADSL/ATM PMD and TC functions. A microprocessor subsystem, on the other hand, performs the rest of ADSL and system functions in software (or in the case of a DSP, by firmware). By way of background, as used herein, PMD stands for "physical medium dependent", and TC stands for "transport convergence." As explained below, the various subsystems noted above, including PMD 120, Microprocessor/DSP 140 and TC 150, are interconnected to each other and to a common shared memory. The latter two subsystems operate together to form a single logical hybrid pipeline, such that individual hardware stages in TC 150 operate simultaneously with software stages in Microprocessor/DSP 140, and such that operations for a particular port are interleaved and sequenced in time between different types of stages. In other words, data output from a hardware stage in the logical hybrid pipeline is directly used as input by a subsequent following software stage, or vice versa. At any moment in time, therefore, a hardware portion of the logical hybrid pipeline will be executing one type of operation on an DMT symbol, while a software portion of the same logical hybrid pipeline will be performing another type of operation on a different symbol. In this fashion, processing operations for a DMT are distributed in an alternating, interleaved fashion between hardware and software pipeline stages. This is superior to prior pipeline techniques, which, for the most part consist of only hardware blocks and are in a fixed physical connection. Therefore, they do not allow software blocks to be interleaved nor do they allow hardware blocks to be added or dropped. Therefore, prior pipeline techniques are not especially suitable for an xDSL environment because of among other things the fact that such arrangements do not allow programmability and gate count optimization.

At the same time, while PMD subsystem 120 does not form a direct part of the logical hybrid pipeline, it nonetheless uses the same common shared memory and same type of data exchange mechanism so that data transfers between it and the logical hybrid pipeline are more flexible, and so as to be able to share the multi-tasking, multi-port sharing capability of the TC subsystem 150 as well as control information embedded in Data Objects as noted below. In an xDSL environment, multi-port system 100 is connected to a remote transceiver 101 and supports a data transmission through a channel 102 (a digital subscriber line—DSL) in accordance with a discrete multi-tone line protocol specified by an ANSI T1.413 standard, and/or as specified by G.DMT, G.Lite, or any other standard known in the art for supporting an xDSL based transmission. Again, it will be understood to those of skill in the art that the particular channel, connection and/or line protocol is not critical to this aspect of the invention, and that the present teachings can be gainfully employed in other non-xDSL communications environments.

An analog front end (AFE) circuit 105, whose structure is again well known in the art and may consist for example of customized line drivers, bandpass filters, analog to digital converters, etc., receives/transmits an xDSL signal in analog form across DSL 102. In general, there is a separate AFE 105 for each port in multiport system 100. Nonetheless, it is possible that a single AFE 105 with multiple subbands could be shared in manner previously described, for example, in U.S. Pat. No. 6,165,050 also assigned to the present applicant and incorporated by refenrence herein. In such arrangements each port of course would utilize only a fraction of the total available bandwidth so that, for example, a multiport system having the form of a shared ADSL or shared VDSL implementation could be effectuated.

When an xDSL signal is received, AFE 105 generates digital samples in conventional form, and such samples are transmitted across a DSL Link 108 to a DSL Link Interface 110 in a manner preferably performed in accordance with the teachings of U.S. patent Ser. No. 09/255,235 filed Feb. 22, 1999, which application is also assigned to the present applicant and is incorporated by reference herein. Such application provides specific details on how to implement a multi-channel xDSL link between an analog codec and a digital controller of an xDSL modem and accordingly is well suited for the present multi-port environment as well. In particular, such system as shown in the aforementioned reference can be used to support a multi-port xDSL communication link 108, by adapting DSL Link Interface 110 to use a time domain multiplexed data bus incorporating embedded control information, by using a separate bit clock and a separate word clock, and through the use of a novel frame architecture so that different transmit and receive rates can be accommodated flexibly and programmably across such link.

DSL Link Interface 110 is coupled directly to PMD subsystem 120; the latter's purpose and operational requirements are also well-known in the art. In general, PMD 120 performs physical medium dependent operations that are a function of the particular channel and physical signalling to be used over the channel. For example, in an xDSL environment that complies with an ADSL standard, DMT symbol modulation and bit timing is performed by this subsystem/layer.

Furthermore, some aspects of the present invention are directed to useful structural and operational improvements for PMD 120, and their particulars and benefits are discussed further below. The basic components of PMD 120 include generally a PMD Layer Task Scheduler 121, an FFT/IFFT circuit 122, a TEQ circuit 123, a decimation filter/dual buffer 124 (on the receive side) and a dual buffer/interpolation filter 125 (on the transmit side). FFT/IFFT circuit 120 is implemented in hardware or software, but, as explained below, is preferably an ASIC that is shared by both a transmit and a receive process to save on space and power. This is why FFT/IFFT 122 is shown coupled to both a transmit data path 122' and receive data path 122" in FIG. 1. TEQ 123 can also be implemented in hardware or software, and in this instance is preferably an ASIC that is used only during a receive process (since there is no need for a corresponding similar operation on the transmit side). A set of interpolation filters/buffers in circuit 125 used in the transmit data path for each ADSL port, and a set of decimation filters/buffers 124 used in the receive data path for each ADSL port are respectively coupled through the DSL link and under control of PMD Layer Task Scheduler 121. The interpolation filters/buffers in circuit 125 and decimation filters/buffers 124 are otherwise conventional in structure, so any suitable implementation known in the art can be used for the same. The only meaningful difference is that each and every one of these circuits are adapted to communicate across common receive data path 122" with the aforementioned shared FFT/IFFT circuit 122, and to format received data symbols into appropriate data objects of the type discussed below for use as an input to such circuit and TEQ 123. Unlike some of the other ASIC blocks described below that are shared between ports, it is not yet commercially practical to share such structures across multiple potts, and so in the present preferred embodiment there is a separate buffer/filter 124 and separate decimation filter/buffer 124 for each port within multi-port system 100. Nonetheless, it may be desirable and feasible in some environments to craft appropriate control logic and structures to achieve some degree of sharing of such functions as well, and accordingly such variations are also contemplated by the present teachings.

Thus, on a receiving path, data from DSL link interface 110 is processed by decimator 124 and TEQ 123, whose output is fed to an FFT 122. PMD Subsystem 120 represents the entry to a logical hybrid pipeline consisting of TC subsystem 150, DSP subsystem 140, Bus Master and external memory 170. In particular, the data output from FFT 122 is appropriately configured into a suitable Data Object as the first item of data to be processed by the first stage of the logical pipeline which includes, as described further herein, a collection of time-sharing ASIC blocks and a microprocessor/DSP that use a common clock and common memories for operating on a series of xDSL symbols from one or more communication ports. As can be seen herein, the Data Object represents a common data exchange mechanism used between functional blocks in the logical pipeline, extending all the way to the end of the logical pipeline, which is an ATM-TC layer. The Data Object is then stored in a system memory 170 through control of PMD Layer Task Scheduler 121 and Memory Controller 130.

Bus master/memory controller block 130 performs standard DMA functions. That is, with a specified start address in memory 170 and a transfer size, it moves Data Objects from TC/PMD subsystems to external SDRAM memory 170 without software intervention. Implementation of this bus master function is standard practice and well known to those skilled in the art, so it is not detailed here.

A Microprocessor/DSP 140 (implementing software portions of the logical hybrid pipeline) then reads the Data Object from system memory 170, performs any necessary processing for a first stage in the logical pipeline (i.e., such as a framing function), and then forwards another Data Object (i.e., a modified version of the Data Object output from the FFT block 122) to hardware portions of the logical hybrid pipeline (i.e., in TC subsystem 150) for subsequent processing. Thus, the hardware and software components of the logical pipeline extending through and including PMD subsystem 120, Microprocessor/DSP subsystem 140 and TC subsystem 150, communicate with each other through such Data Objects, and through shared system memory 170. To reduce transfer bandwidth requirement between hardware blocks and external memory that stores the data objects, the Microprocessor/DSP subsystem 140 and TC subsystem 150 also include their own local buffer memories as well for storing and exchanging data within software/hardware portions respectively of the logical pipeline.

Similarly, in a transmission path, Data Objects processed by TC subsystem hardware 150 and processor software 140 are formatted in a Data Object and forwarded to IFFT 122 via PMD task scheduler 121 in a form suitable by this stage. Thus, both TC subsystem 150 and PMD subsystem 120 have their own respective task schedulers (151 and 121 respectively) interfaced to microprocessor 140 through memory controller/bus master 130. These task schedulers and memory controller 130 are used to perform Data Object transfers between the TC/PMD subsystems and the external SDRAM 170 in any number of well-known ways that are suitable for this environment.

As discussed generally above and explained further below, the logical hybrid pipeline is partitioned in hardware/software portions according to an efficiency rating based on effective instructions per second that are achievable with a particular hardware/instruction based structure. Accordingly, in the embodiment of FIG. 1, the hardware components of the logical hybrid pipeline in TC Subsystem 150 consist of ASIC blocks that provide the most efficient MIPS/gate count performance for each functional task indicated. For any ADSL blocks that are not implemented in ASIC, they can instead be implemented in software by the microprocessor (or a DSP) subsystem 140.

In a preferred embodiment, Transmission Convergence (TC) Subsystem 150 performs a number of well-known general TC layer functions, including: (1) cyclic reduncy check (CRC) computation, (2) scrambling, (3) RS coding, (4) Trellis coding and Viterbi decoding, (5) quadrature amplitude modulation (QAM), (6) frequency domain equalization (FEQ), (7) gain scaling, (8) tone shuffling, and (8) ATM-TC. The ATM specific portion of the -TC sublayer and software blocks implemented by microprocessor (or a DSP) subsystem 140 and, in particular, performs the following tasks: (1) generating and recovering DSL symbols (frames) so that ATM cell data can be extracted; (2) adjusting an ATM cell flow in accordance with the characteristics of the DSL frames; (3) delineating the boundaries of ATM cells so that their contents can be recovered; (4) detecting errors from the header information in the ATM cells; (5) maintaining synchronization and rate decoupling in the link by inserting idle cells to adapte the rate to the capacity of the system.

As shown, each of the ASIC hardware blocks (i.e., such as Rx Scrambler and CRC 154, Tx Scrambler and CRC 155, RS Decoder 156, RS Encoder 157, QAM Decoder 158, Tone Shuffler 159, QAM Decoder 160, etc.) are connected to their respective task scheduler (TC Layer Task Scheduler 151) through a TC Local Bus 153. An additional "X" block 161 represents one or more additional functions implemented in ASIC or FPGA form as may be required for any particular environment. A local Intermediate Buffer 152 is used as a scratchpad memory for storing Data Objects and other data as it used/passed around to hardware components of the TC Subsystem 150. TC Layer Task Scheduler 151 itself is connected through a bus 134 to microprocessor subsystem (uP core/DSP Core) 140 through Memory controller/bus master 130 to provide data transfer, including transfer of Data Objects between such ASIC blocks and system memory (External SDRAM/Flash) 170. The latter can take any conventional form, and in a preferred approach is a shared system memory to further reduce costs and enhance integration options for system 100. As seen in FIG. 1, and explained further below, this arrangement of TC subsystem allows it also to be implemented as a form of logical pipeline. This is because at each timing interval each of the ASICs performs a particular operation on an input Data Object, and the resulting output Data Object can be stored in TC memory 152 for use by another ASIC in the subsystem. Accordingly, using this form of common memory, eliminates the need for individual buffer stages between the ASIC blocks, and allows for greater flexibility since the pipeline operation (i.e., a particular set of needed operations) can be programmed in any sequence, and with certain ASICs added or dropped as may be required for any particular environment.

It will be understood by those skilled in the art that the particular functions implemented by TC Subsystem 150 in the form of ASIC blocks will vary according to the communication environment where the present invention is used, and that present invention is not limited by the types of functions that are performed in such subsystem. For example, it may be desirable to permit operator/user control to selectively modify, or even enable/disable particular function blocks to tailor/customize TC Subsystem 150 for a particular environment. In other instances, additional computation resources in the form of an embedded reconfigurable logic core could be used in lieu of one or more of the ASIC blocks to provide further programming flexibility and alteration of the functions of system 100, such as to support an additional formatting of the xDSL data for a new standard, or to support a variation on an existing standard. While this approach would not necessarily achieve the gate reduction and efficiency of an all-ASIC implementation, it may be desirable in some environments where flexibility/reprogrammability is more important than overall cost. This customization/control of system 100 could be done by direct programming of Microprocessor/DSP 140 through a separate control bus (not shown) and would enhance the flexibility of a multi-port system by permitting dynamic reconfiguration of system 100 as needed to accommodate a particular logical layer protocol, a particular physical transmission protocol, etc., and can be done in a manner suitable to change any appropriate state machine control logic in the respective schedulers.

Microprocessor/DSP subsystem 140 consists of a standard DSP core and associated support circuitry (ROM, RAM, NVRAM and BIU) capable of executing signal processing functions and other ATM layer operations suitable for an xDSL application, and other functions necessary for supporting ATM over DSL. In a preferred embodiment, DSP core is a RISC based processor executing generic control and signal processing instructions for handling an ATM/DSL based data transmission. As the software portion of the logical pipeline, Microprocessor/DSP subsystem 140 effectuates the following xDSL related functions: Framing/DeFraming, Interleaver, Timing recovery, FEQ coefficient adaptation, and specialized operations as may be needed to support particular standards, variations on standards, etc.—for example various issues to T1.413 and various annexes for ITU based standards. It should be noted that these particular functions include at least two common characteristics: (1) relatively low MIPS requirements; and (2) a relatively high need for software programmability and/or subtle variations due to minor differences between communications standards. For instance, Japan uses a different annex than the US and Europe for the ITU ADSL standard, but it is undesirable to have to support two different hardware implementations for two different standards. Thus, the present invention allows for a single hardware platform to support multiple disparate standards through software control included in the software portion of the logical pipeline.

Furthermore, by placing only relatively low MIPS based functions in the Microprocessor/DSP subsystem 140, a single DSP core of average MIPS performance can be used to support even multiple ports, and this saves considerably both in cost, complexity and power dissipation. In other words, even when multiplying the MIPS count of a single port for such functions by some factor N (where N is the number of ports) and accounting for other administrative overhead tasks, an average DSP is all that is needed for this portion of the logical pipeline. This is a significant savings over the standard prior art approach, which generally speaking requires multiple DSPs to support multiple ports.

Moreover, if Microprocessor/DSP subsystem 140 is programmed to support all xDSL related functions (not just the ones mentioned above, but the ones also performed in TC subsystem 150 in ASIC form)—as can be done typically for most conventional DSPs designed for data communications using some additional firmware—then it is possible in some instances to support one or more ports entirely in software alone. This is because again most DSPs of even average performance can support a single port operating at full rate, and as improvements in DSP architectures and manufacturing increase, an even greater number of ports can be supported depending on available MIPS. In such cases, therefore, where only a small number of ports might be active in a full rate mode at a particular time, the present architecture is sufficiently flexible so that the allocation of xDSL tasks can be changed from a mixed hardware/software (hybrid) pipeline mode to an entirely DSP-software based mode. Such purely software based mode might be used in other instances as well, such as when several ports are in a low power mode such as that required by the ITU G.lite standard, which do not require extensive amounts of computing resources to support, and also under circumstances where it is desirable to fully exploit the investment provided by a fixed gate count DSP. An advantage of such a pure software approach (for a limited number of ports, and/or a limited data rate for such ports) is that the entire bandwidth of a fixed cost DSP could be exploited, while TC Subsystem 150 could be powered down selectively or entirely to further reduce power dissipation in an SOC implementation. Moreover it may be desirable for testing, diagnostic or benchmarking purposes to use both a mixed hardware/software pipeline and a pure software pipeline at the same time for a particular symbol (or group of symbols) and/or or a particular port (or group of ports).

As with TC Subsystem 150, it will be understood by those skilled in the art that the particular functions implemented by Microprocessor/DSP Subsystem 140 in the form of software instructions will vary according to the communication environment where the present invention is used, and that present invention is not limited by the types of functions that are performed in such subsystem. For example, it may be desirable to permit operator/user control to selectively modify, or even enable/disable particular function blocks to tailor/customize Microprocessor/DSP Subsystem 140 for a particular environment. As an example, one of the lower MIPS functions performed by TC subsystem 150 in hardware might instead be performed in software by Microprocessor/DSP Subsystem 140 so as to change the mix of the hardware and software components of the pipeline dynamically. This could be done, for example, for testing purposes, as part of a power dissipation optimization determination, or to provide additional programmability for a function in response to an unexpected change in a communications standard that would otherwise require an entirely new silicon implementation. In other instances, additional computation resources in the form of an additional host processor could be coupled through bus 132 to supplement such subsystem to support new functions, to provide additional processing capability/bandwidth, or to support a new standard, or to support a variation on an existing standard. As above, this customization/control could be done by direct programming of Microprocessor/ DSP 140 through a separate control bus and in a manner suitable to change any appropriate state machine control logic in the respective schedulers.

A detailed discussion now follows of the pipeline subsystems note above, as well as the Data Objects used for passing data within the infrastructure of the logical pipeline. Initially, however, Applicant provides a further explanation of a preferred design methodology that is used to determine the structure and operation of the logical pipeline described herein. In this regard, Applicant has investigated and formulated particular tools and benchmarking parameters that are extremely beneficial for assisting a multi-port designer to arrive at an optimal mix and arrangement of hardware/ software components for a logical pipeline. Applicant believes that this design method yields a SOC solution that can be optimized for density, cost, power and/or performance for any given multi-port communications that includes PMD and TC subsystems.

III. Description of Systems and Other Components

A. EMKG Analysis

This section explains how to estimate the EMKG for each ADSL block used in a logical pipeline, so that a determination can be made as to which implementation (ASIC or DSP) is more effective for any particular function, and for any particular data path (receive or transmit).

First, it is more efficient to implement ADSL blocks in the transmission direction in ASIC for ATU-C (CO) applications, and it is more efficient to implement ADSL blocks in the receiving direction in ASIC for an ATU-R (CPE) application. This is easily understood from the discussion below since the downstream direction in an ADSL environment requires more computations than an upstream direction. So, after considering a data path factor such as the relative bandwidth or transmission rate required for transmit and receive directions, the Applicant has determined that for an ADSL application at least, the downstream path is preferably implemented entirely in ASIC form. Of course for other xDSL standards and environments the transmit and receive data paths may have different requirements, so a different mix of hardware and software may be used, and the choice of the same will be apparent to a skilled artisan from the present teachings. Furthermore, when a second time-sharing factor is considered, it becomes even more efficient for certain ADSL task blocks in the upstream direction also to be done in ASIC form.

Table 200 in FIG. 2A presents a quantitative analysis devised by the Applicant for determining an appropriate implementation of an xDSL system. In this table a breakdown is provided for several functional tasks associated with an xDSL transmission/reception by an ATU-C system. Looking at one example, a design module 201 (such as an FEQ) requires a certain number of effective MIPS 202, which are realizable in silicon form by a number of ASIC gates 203. A benchmark performance therefore for an ASIC implementation is provided in EMKG rating 204, representing an effective number of MIPS per gate achieved by the particular ASIC for such particular xDSL function. A normalized computation time 205 (roughly a figure in microseconds) associated with the task is also provided to help identify those areas where time-sharing of a block might be possible. This process is repeated for each of the entries 210, and then the table is ordered according to EMKG rating 204.

By way of reference, Applicants have calculated that a typical low cost DSP can achieve a nominal EMKG rating of 0.2 to 1.2 or thereabouts, while some state of the art (but expensive) DSP architectures can achieve an EMKG rating of 2 or higher. While this figure is expected to improve of course with advances in architecture and processing technology, significant technological barriers exist to a multi-port solution implemented using a single DSP. Thus, it is expected that any future multiport architecture will benefit from the present teachings, regardless of the available DSP power.

As shown in table 200 of FIG. 2A, most blocks of an ATU-C in the receiving direction (i.e., upstream transmission) except a TEQ have a low EMKG rating 203. Therefore, it is more effective (from a gate/transistor count perspective but without considering time/task shared factors) to implement them in DSP. As can be seen, the total effective MIPS required for the shaded receiving blocks in FIG. 2A is about 39. Therefore, it should be comfortable to implement these blocks with a 100 to 150 MIPS processor for a four-port ADSL solution, with remaining MIPS available for ADSL framing, EOC, AOC, performance monitoring, and ATM functions. In this case, the total number of gates for the rest of ASIC blocks in the table is about 100 k gates. For higher integration of ADSL ports such as 16 ports in one ASIC, multiple DSP porcessors can be required when one processor is not able to handle all software tasks. With simple modifications of the Memory Controller and Bus Master 130, it is easy and scalable to add multiple number of DSP processors.

Next, as shown in a table 250 of FIG. 2B, most blocks of ATU-R in the transmission direction (except the IFFT) noted with shading have low EMKG and can be implemented in DSP. The total number of gate counts of the rest of blocks in the table is close to 200 k gates.

Second, we note that the ASIC block gate counts of the same type but in opposite directions are approximately the same. The only exception is RS encoding and decoding because the decoder requires additional error correction logic. This observation leads to two important techniques that we can incorporate in the new architecture.

1. First, where possible, it is advantageous to use the same ASIC design for both opposite direction operations. This has been done for the FFT and IFFT case, as discussed above for circuit 122 in PMD subsystem 120. With this task sharing consideration in mind, it is more attractive to implement these blocks in ASIC. Furthermore, this flexibility means that we can run the same ASIC as either an ATU-C or ATU-R.
2. For multi-channel solutions, the EMKG will be increased by the number of reuses for either inverse operations (i.e. encoding and decoding in one block) or multi-channel sharing.

In summary, the parameter EMKG is a useful metric to decide how we implement ADSL blocks. In many cases, however, by sharing the same block for either opposite operations or for multi-channel operations, an ASIC implementation becomes more attractive even for otherwise low EMI(G rated ASICs. On the other hand, the configuration for different channels and opposite operations are very different. Accordingly, for any particular application, the final mix and allocation of tasks to ASIC and DSPs will be a function of not only the EMKG rating, but also of the ability to share an ASIC within a transmission period for more than one port, more than one task, or more than one transmission direction, and furthermore on the need for reprogrammability that may be useful for to accommodate implementation variations.

To accommodate such variations, and to move data efficiently and flexibly throughout the logical pipeline between DSP and ASIC subsystems, the Applicant has devised a unique Data Object to faciliate such operations. An explanation now follows of the concept and details of such Data Objects, which allow the above objectives to be achieved in an efficient way.

B. Data Objects

The above subsystems of the logical pipeline interact using a protocol that includes Data Objects as described earlier. A data object is a data structure that consists of both control parameters and data . The primary purposes of data objects are as follows.

1. As a mechanism for entities ofone computation block (either software or hardware pipeline stage) to pass on to the next computation block (i.e., another software or hardware pipeline stage).
2. As a mechanism for allowing timesharing of ASIC computation blocks for multiple ADSL channels. Inside each data object, there are control parameters specific to a given ADSL channel. With this, an ASIC computation block can act accordingly.

Both the software blocks (run by the microprocessor/DSP) and hardware blocks (implemented in ASIC form) of the logical pipeline can form these data objects. For example, a framer routine in software forms Data Objects for a hardware CRC/scrambler to process, and the hardware CRC/scrambler also forms an output Data Object as input for a hardware RS encoder to process. To generate Data Objects, both software and hardware blocks within the PMD Subsystem 120, TC Subsystem 150 and Microprocessor/DSP subsystem 140 can be adapted in any number of conventional ways to collect data, configuration information, etc. and form the Data Object. Data Objects are exchanged and transferred across software and hardware portions of the logical pipeline using or more task schedulers and a system memory 170. Thus, all data objects between tasks are stored in either local memory (i.e., such as a TC memory buffer 151 or a scratchpad memory for a DSP) or system memory 170.

The primary responsibility of receiving transfer requests from hardware and software blocks and moving Data Objects between system memory and the various blocks is performed by TC Layer Task Scheduler 151 as detailed below. TC Layer Task Scheduler 151 is configured in conventional fashion to have a table indicating where Data Objects are located and their size.

The general structure of a Data Object 300 as used in each subsystem is shown in FIG. 3A. With this structure, some or all ASIC blocks can be shared with multiple ports and can handle either transmitting/receiving directions. Each ASIC block is configured to operate in a specific way as specified by the control and configuration parameters provided in Data Object 300, i.e., much in the same way an operand of an instruction would be decoded by a typical microprocessor/DSP machine. In this regard, therefore, the Data Objects 300 behave much like a form of an intelligently formatted xDSL instruction that is passed around to various processing units (the ASIC and DSP task blocks) where it is decoded and acted upon (executed). Similarly therefore system 100 can be considered a form of multi-symbol/multi-port xDSL pipeline processor.

Data Objects 300 are structured to have a number of different Data Object parameter fields 310, which are generally broken down into three different types of sub-fields: a set of standard Data Object fields 311 and reserved Data Object fields 312, a set of task specific Data Object fields 313, and a block data 314 representing either input data to be processed or output data resulting from theprocessing of the input data. An explanation for these sets of data object fields is given in FIG. 3A for each field, broken down into field identifier 301, field size 302, field meaning and use identifier 303, and further field related remarks 304. The particular meaning of such fields is elaborated further below:

1. Port ID. For certain types of ASIC blocks such as CRC and scrambler, proper processing of one Data Object 300 depends on the previous state of such ASIC block, which is maintained for each port. Therefore, it is important for these ASIC blocks to be able to identify the Port ID of the data in Data Object 300 and perform proper processing.
2. Common Operation Control. This field provides common operational control information for Data Block 300 that is handled in the same way by each ASIC block and ensures that it is processed properly by all ASIC blocks and allows for directional sharing as described earlier. For example, a "transmission/receiving" control bit 1 provides directional operation control for a block—such as RS task block—to perform either encoding or decoding (depending on whether the direction is for transmit or receive). "Bypass" bit 2 provides control information to instruct an ASIC block to skip the operation for Data Object 300 when the symbol associated with the data is a "stuffing symbol" as discussed further below. Bit 0 is used to identify whether the data object is associated with an ATU-C or ATU-R port. This feature allows the present invention to effectuate a mixed mode solution, wherein both ATU-C and ATU-R ports can be supported by a single chip at the same operating time.
3. Block Specific Control. This field is interpreted differently by each different ASIC operational block. Specific control bits are given for a given ADSL related operation, so that, for example, this bit could be used by an IFFT to indicate whether the CP should be added or not. Other examples will be apparent to those skilled in the art. The key point is that each ASIC block is provided with appropriate decoding logic (as discussed furthe below) for understanding (decoding) a Data Object 300 that includes control bits intended for/specific to such ASIC block.
4. Size of Port Specific Control. This field specifies how many bytes are required by the port-specific control information that form the last portion—a set of port specific Data Object fields 312—of Data Object 300.
5. Sequence Number. To further enhance control and processing of transmit/receive data, Data Object 300 can be given a sequence number identifier, which sequence number identifier can be shared by a set of one or more given Data Objects. In the present embodiment both software and hardware uses this sequence number for control purposes, but in a preferred embodiment it is only set/configured in software by the software blocks in the pipeline.
6. Reserved. These fields are included to provide further functions and variations specific to a particular application environment, or for a later upgrade, etc.
7. Task/Port Specific Controls. This field provides customized data and additional control information to a particular ASIC block that is both task and port-specific, i.e., configured especially to accommodate variations fro a given ADSL computation and for a given port. It is variable in length, and is a function of both type of ASIC block and port configuration information.

It will be apparent to those in the art that this is but a single useful example of a general Data Object embodiment, and that any actual system implementation will require specific customization and inclusion of additional parameters for Data Object 300 that are peculiar to such environment. Accordingly the present invention is by no means limited to any particular detailed implementation of such Data Object. Furthermore, it may be desirable and feasible in some environments to use Data Objects that are alterable or expandable through the use of one or more portions of reserved field 305. In this fashion, customized operations and/or future variations can be accommodated on a software level through Microprocessor/DSP Subsystem 140.

An illustrative example of how a Data Object 300 would be used by a multi-port ADSL system 100 of the present invention is now provided with reference to FIG. 3B. For example, in an ADSL transmission system, a particular Data Object 310 might be used as an input to a Scrambler ASIC block 154 and a separate RS Encoder ASIC block 157, both of which are well-known functional task blocks in an ADSL system. In this instance, a Data Object 310 can be set up in the same way for both functional units (i.e. with the same field formatting), and thus used for both a scrambling block 154 and an RS encoding block 157 so that the scrambling output can be directly fed to the RS encoding input through only memory buffering. In other words, Data Object 310 is configured before being input even to the scrambler stage to include any necessary RS associated variables/configuration information that would have to be passed to the RS encoding stage later. This innovation avoids any intermediate software processing that might be needed, and provides both speed and flexibility. Similar types of implementations will be apparent to those skilled in the art for ADSL and other environments, so that a set of multiple processing stages is configured to use a single format Data Object, which data object contain all necessary parameters for each stage either explicitly at the first input of the first block, or is modifiable in some fashion between blocks to contain the appropriate configuration information for each block. To maintain future flexibility as standards evolve, however, it may be desirable in some environments to add any additional necessary software processing between the scrambler output and RS encoder input, or between two other related serial stages.

Again, this is intended merely as an example of a useful embodiment of a Data Object that could be used by such task blocks within an ADSL environment. Other variations and adaptations will be apparent to those skilled in the art based on the present teachings. The various registers used by the hardware/software blocks, such as history registers, CRC registers, etc., can be implemented in any conventional manner compatible with the present teachings.

C. ASIC Processing Blocks

Figure 4:
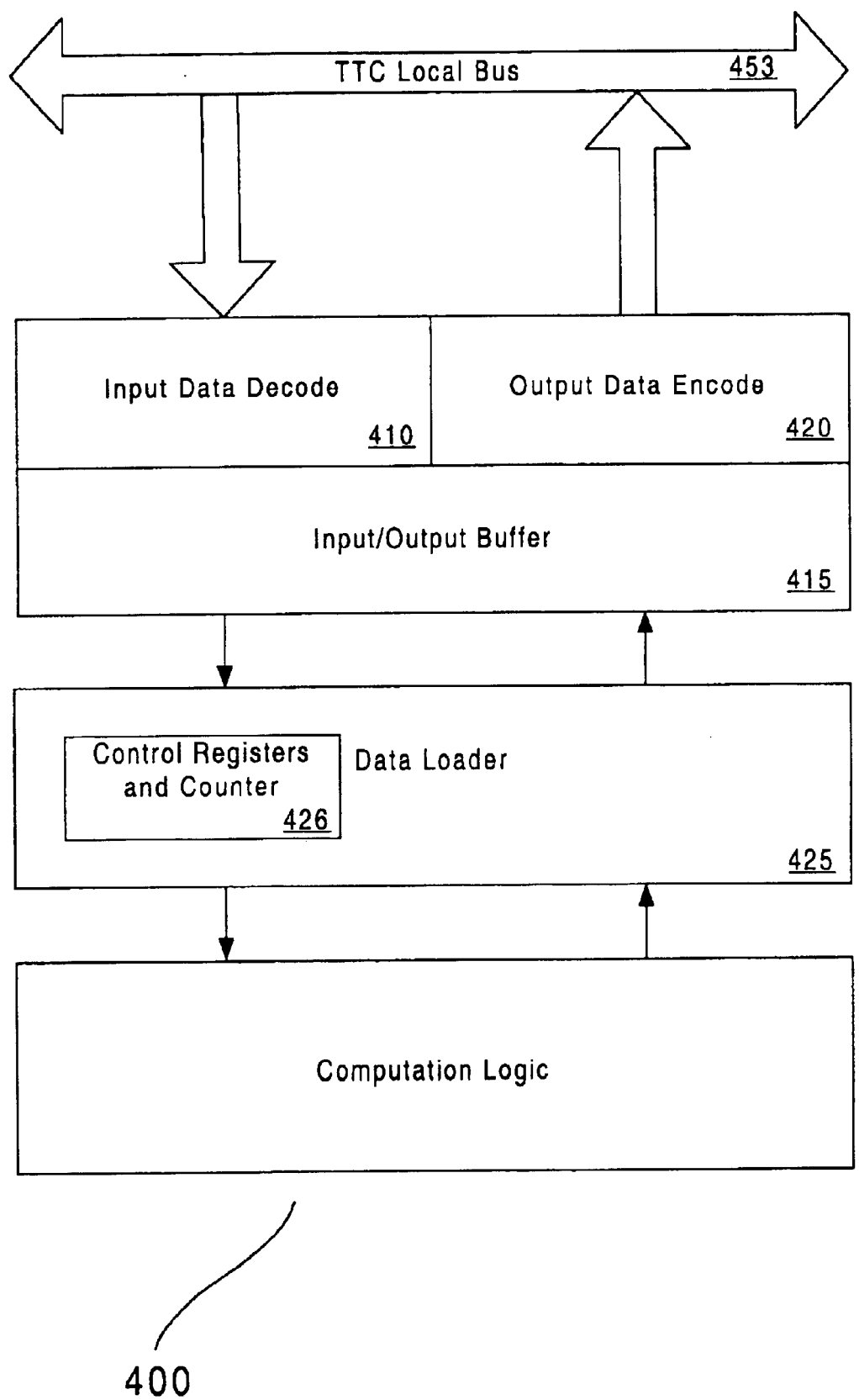
FIG. 4 is an electrical block diagram depicting the material aspects of an embodiment of a general ASIC processing block of the present invention, and which is particularly suitable for the embodiment of FIG. 1.

FIG. 4 illustrates an electrical block diagram of an ASIC xDSL function block 400 used in the present system 100 as part of the hardware portion of a logical pipeline within TC Subsystem 150. This ASIC processing block uses a Data Object of the form discussed below, and can be used as a form of rudimentary programmable co-processor to implement an xDSL related processing function such as a CRC, Scrambler, RS coder, etc., based on parameters specified in the data object In this manner, ASIC xDSL function block 400 acts as single stage of a logical pipeline, to assist in the execution of all necessary set of operations required for a complete xDSL symbol transmit/receive task.

As shown in FIG. 4, an Input Data Decode block 410 coupled to TC Local Bus 453 reads (decodes) the contents of an input Data Object 300 and sets up later stage computation logic in ASIC xDSL function block 400 to perform a required computation based on input parameters specified in the aforementioned Data Object fields 310. The form of I/O Data Decode block 410 is not critical, and can be implemented using any number of well-known techniques in the art Input/Output Buffer 415 stores input and output data for computation. Depending on the specific function performed by ASIC xDSL function block 400, this part of the circuit can be a shared buffer for both input/output, separate input and output memory blocks, or an input buffer only. For example, a CRC block only needs to compute a cyclical redundancy check (CRC), which in an ADSL application is a single byte. As a result, there is no need for a separate output buffer. For a Reed-Solomon (RS) encoder function, since ASIC xDSL function block 400 will compute a syndrome and keep the rest of the data input unchanged, the output buffer is shared with the input buffer in the form of some additional storage to store the syndrome. For a scrambling function, on the other hand, the output of ASIC xDSL function block 400 can overwrite the input. As a result, the input and output can share the same buffer space. Again, other variations for such buffer are possible, and the above is not intended to be an exhaustive list of possibilities. Other implementations and modifications suitable for the present system will be apparent to those skilled in the art.

Once data is ready from Input/Output Buffer 415, logic circuitry in a Data Loader 425 is adapted to read such data one word at a time and to feed it to Computation Logic 430 for computation/execution. The size of each word read, of course, depends on the specific computation function performed by ASIC xDSL function block 400. Data Loader 425 further includes a set of registers and counters and logic for initiating upload and download requests for ASIC block 400 as described further below. The form of Data Loader is not critical, and can be implemented using any number of well-known techniques in the art based on a particular set of transmission/receive tasks specified for the logical pipeline.

The final circuit portion of ASIC xDSL function block 400 is a Computation Logic block 430, which performs the specific logic functions such as CRC, scrambling, RS coding, TCM, etc. Again, the specific implementation for performing these types of functions in ASIC form is well-known in the art, so it is not provided herein. When Computation Logic block 400 is finished, any output data goes back through Loader 425 and Input/Output buffer 415.

At this point, Output Data Encode block 420 receives the computation output and then combines it with any other operational parameters generated by ASIC xDSL function block 400 that must be associated with the particular function to form an output Data Object The Data Object is then returned back to system 100 for further processing by a next stage in the logical pipeline.

With the architecture above, each ASIC xDSL function block 400 can be very generic, and this provides the present invention with flexibility that is superior to prior art fixed function ASIC solutions. That is, each hardware block essentially acts like a form of software routine (i.e., a single instruction) and can function according to specified input parameters (which can be considered as a form of instruction operand). In this regard, therefore, the ASIC blocks of the present invention are a kind of hybrid between a hardwired but fast logic circuit and a very programmable but task-specific signal processor. For example, a ASIC xDSL function block 400 performing a RS coder function can operate as an encoder or decoder based on a configuration specified by Bit 1 of Common Operation Control field 302 in Data Object 300. That is, if such ASIC xDSL function block 400 is used for a transmission task, it will function as an encoder, and if it is used for a receiving task, it will function as a decoder. For either encoding or decoding, the code word size and redundancy size are specified in Port Specific fields 312 shown in Data Object 310 discussed earlier. In this manner the effective EMKG is significantly increased by the fact that a particular ASIC block can be used to perform more than one task, including for both receive and transmit processes.

As explained also below in more detail, some ASIC blocks also can be time shared within a single DMT processing cycle, and this further enhances their EMKG and desirability for use within a multi-port architecture.

Finally, as illustrated earlier, some ASIC blocks can be configured to use otherwise identically formatted Data Objects. In other words, a Data Object 310 can contain control information for CRC and RS coding. As a result, an output from a CRC block 155 can be fed to an RS encoding block 157 directly through common system memory 170 or local Intermediate Buffer 152. This provision avoids software intervention and thus further reduces the computation power required by the present system.

D. Logical Hybrid Pipelining

The interaction between software and hardware portions of system 100 can be understood as follows.

1. Each ADSL block, whether it is done in ASIC or software, is considered as a "logical" block, or a stage in the pipeline.
2. The input and output of each block is based on the format for a Data Object as defined in FIGS. 3A and 3B.
3. All the blocks combined form a "logical hybrid pipeline" that is clocked by a periodic, fixed timings at 4 kHz×(69/64). This timing is based on an ADSL symbol period when there is no cyclic prefix, and is generally referred to as a DMT symbol clock herein. Thus, it will be understood by those skilled in the art that the current pipeline is constructed around this parameter of an ADSL system, and in a different environment, a different pipeline clock could be used. This pipelining operation 500 used by the present system is illustrated in a flow form in FIG. 5A, with time slots designated 501A, 501B, etc., and with diagonal lines representing the fact that data flow can occur between two logical block units that are not necessarily in a conventional physical pipeline as is required by the prior art. Again, the prior art is not capable of any "logical" operation as it uses fixed hardware buffers between every pipeline stage, while the present invention's logical pipeline includes at least some interconnected pipeline stages that use only a single common memory for exchanging I/O data. Nor is there any mechanism in the art for interleaving hardware and software pipeline stages to form a logical "hybrid" operation where results can be exchanged between two different types hardware and software) directly through a common memory. Thus, with this structural approach, any of the blocks operating in each time slice can be done in either hardware or software, thus representing a hybrid or combination hardware/software pipeline. The logical hybrid pipeline is arranged such that any hardware processing stages (TC Subsystem 150, PMD Subsystem 120) can exchange Data Objects with software processing stages (executed by a host processor or DSP Subsystem 140) through a common system memory 170. The pipeline is loaded so that various processing ADSL processing tasks of individual, sequential symbols are broken up across a combination of hardware and software stages, but without significant delay or latency. In the example shown in FIG. 5A, the xDSL related functions indicated in the top of the timing diagram are implemented in software stages, while the bottom portion of the timing diagram illustrates operations performed by hardware stages. This provides a maximum flexibility for scalable multiple design, as resources can be allocated and used from a host computing system, for example, as needed to support (and supplement if necessary) the operation of the system on a dynamic basis.

Figure 5B:
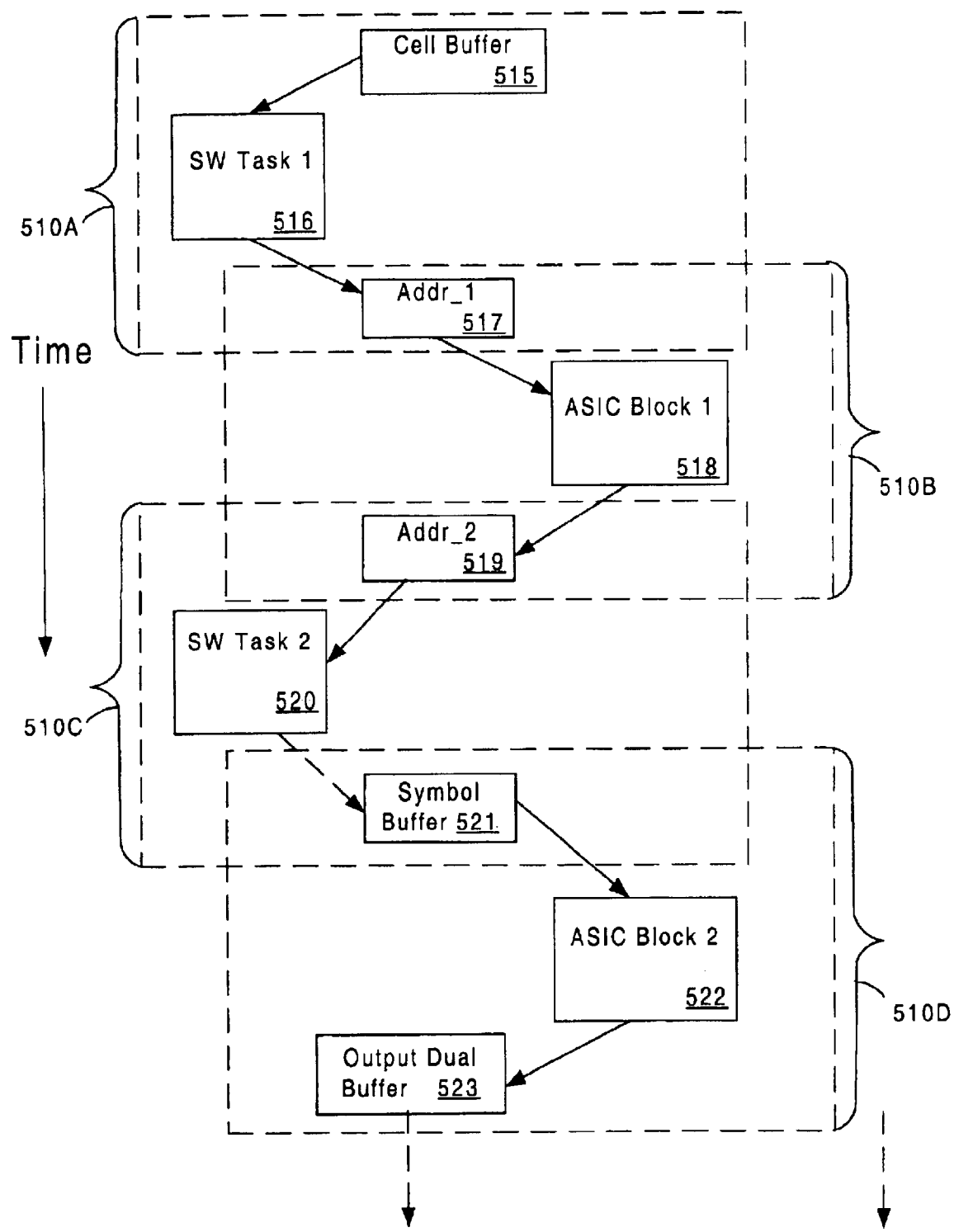
FIG. 5B provides an illustration of the relationship of mixed hardware and software task blocks used in the logical pipeline of the present invention.

The DMT symbol clock in this logical pipeline is used for the following purposes.
a. To serve as common pipeline timing. Both hardware and software tasks start at the beginning of the clock, and finish by the next clock corresponding to one time slice of the pipeline.
b. To generate CPU interrupts for the software to perform its tasks. It is used to generate the CPU interrupt for the software to perform its tasks. This interrupt is once for all the ports. Therefore, it minimizes the context-switching overhead. It is used to signal the hardware to access the memory for one of the two pages. As will be explained, there are two pages of data memory. At a given time, both ASIC and software ADSL blocks will get input from one page, and generate output to another page. With this, at the next DMT interval, both ASIC and software blocks will switch their input and output to a different page. This forms a dual-buffer interface between the hardware and software, illustrated generally in FIG. 5B. As seen in this figure, an ATM cell buffer 515 provides an input to a first software task block 516 for a first pipeline operation during a first clock period 510a. The output is sent in the form of a Data Object 300 to a first page 517 in memory 170, where it is used as an input by an ASIC xDSL Function block 518 (second pipeline stage) during a second clock period 510B. After processing, an output again in the form of a Data Object 300 is then stored in a second page 519 of memory 170, where it is read and used by another software task block 520 (a third pipeline stage) for a particular computation during a third pipeline clock period 510C. The output is sent in the form of a Data Object 300 to a symbol buffer 521 in memory 170, where it is used as an input by an ASIC xDSL Function block 522 (fourth pipeline stage) during a fourth clock period 510D. At the end of such period, the result is available again in Data Object form in an Output dual Buffer 523, where it is available again for a subsequent processing stage until the entire set of transmission tasks is finished for a particular symbol (frame). With both ASIC and software ADSL blocks synchronized to the same memory pages, we can achieve the flexibility in adding or dropping any number of ASIC blocks between software blocks. As ADSL standards evolve, this maximizes programmability, and ensures that the present approach will be attractive in a number of communications environments having similar upgradeability requirements.
4. With the logical pipeline clocked by the fixed clock, both the software and hardware blocks start performing their predefined tasks at the beginning of each time slice interval. However, within this same clock interval, different task blocks can operate on different DMT sequence symbols. This is illustrated in FIGS. 5C and 5D, where a number of different pipeline operations 560 occur during a DMT symbol clock interval. It can be seen here, for example, that a software stage implemented by a software (host/DSP processing) based routine (such as a Framer) can be operating on a first symbol (#n) while a hardware based ASIC block (such as a Scrambler) can be operating on a second symbol (#n+1) during a DMT symbol clock period 550A. This is true as well for later clock periods 550B, 550C, etc. As a result, for multiple port processing, there is no dependency on the start and finishing timings of the various hardware and software task blocks. Therefore, this is one of the key elements that enable scalability and make the current architecture exremely attractive. It should be noted again that the embodiment of FIG. 5C is merely illustrative, and that specific allocation/ partitioning of task blocks across software/hardware forms will be a function of the particular system design. It may be further desirable, for example, to implement the same function (for example framing) in both hardware and software form at the same time within a logical pipeline if it makes sense to do so from an operational perspective. Furthermore, in some applications, it is entirely possible that the pipeline might not be implemented in hybrid form, but will still be implemented in a logical form so as to exploit the advantages of using a set of purely hardware pipeline stages using a common memory. This arrangement would still permit the addition and/or removal of additional pipeline stages as desired for a particular environment/data transmission. The final selection and arrangement of the processing stages in hardware and/or software form for any particular implementation is expected to be a routine optimization task well within the skill of an ordinary artisan.

Another significant advantage of the present technique lies in the fact that when additional processing stages that might be necessary to implement a particular standard are needed (or a prior implementation needs to be changed), they can be conveniently and easily added/modified in the pipeline without requiring changes in the hardware or software portions of the logical pipeline.

E. Pipeline Clock and Stuffing Intervals

The pipeline clock as shown in FIGS. 5A, 5B and 5C is selected to be at 4 kHz×(69/64) based on the following considerations.

1. Different physical ports may have different clock timings. As a result, they may have different symbol frequencies.
2. For a given port, the symbol timing can be either 4 kHz×(69/64) when there is no cyclic prefix used in the transmission (as occurs in a first part of a handshaking routine for example) or 4 kHz×(69/68) when there is cyclic prefix (as this is the case in the second part of a handshaking routine and during showtime—i.e., a normal data transmission).
3. To simplify the ASIC design complexity, only one clock, 4 kHz×(69/64) (faster one), is used. As a result, this will be sufficient to handle the variation occuring during the initialization routine as well, when the rate is reduced to 4 kHz×(69/68).
4. Therefore, after 68 symbols at rate 4 kHz×(69/64), there are 64 symbols at rate 4 kHz×(69/68).

As a result of operating at this higher rate, during Showtime for a given port, there are intervals (precisely 4 out of 68) that do not have active symbols to process. In this case, both software and hardware pipeline stages skip the processing for the given port at the given DMT interval. This time interval of that port is called a "stuffing interval", in analogy to that used in some TDM systems.

In practice, software in system 100 checks a symbol buffer occupancy from a PMD Subsystem 120. If there is not at least one full symbol in the buffer, it skips the processing of all the tasks for the given port during such clock period. However, to maintain and support the "page swap" operation with other ports, the software still sets up the necessary Data Objects for the ASIC blocks to access. To indicate to the ASIC block that it should skip computation for the Data Object, the "bypass bit" in Common Operations Controls Field 302 is set as defined in FIG. 3A. It should be noted that the particular clock rate selected will be a function of system design criteria, so that, while the present disclosure adopts the aforementioned clock rate parameters, it is expected that there will be wide variations from implementation to implementation. The important consideration is that the clock rate can be reduced from that required from the front end Codec circuitry so that overall power can be conserved as discussed further below.

In summary, this clocking aspect of the invention solves a problem that is inherent in prior art multiport systems when different ATU-R ports within a particular receiving system may operate at different clock timings due to different timings at their respective ATU-C side counterparts. As a result, the "DMT symbol rate" for each port in a prior art system is not the same, resulting in asynchronous timing. To accommodate this idiosyncrasy, the present invention superimposes a synchronous architecture. In deciding which synchronous approach is most desirable, we note that the nominal DMT symbol rate during showtime (data mode) and part of handshaking is 4 kHz*(69/68), and is 4 kHz*(69/64) during the beginning part of handshaking. Therefore, a simple but extremely useful method to accommodate all of these situations is to synchronously operate all ports at 4 kHz*(69/64), which is faster than any ADSL ports during data mode.

As a result, during normal operation, TC subsystem 150 and the software portions 140 of the pipeline both will check if there is valid symbol to process from the PMD subsystem 120. On the average, there will be 5 out of 69 intervals for which there is no need to process any symbol. The Data Objects created during these intervals, therefore, are designated by the system as stuffing symbols or stuffing Data Objects. These special data blocks are identified by including a settable "bypass bit" in the Data Objects, so that the various hardware/sofware task blocks will skip any operations normally performed on such entities.

F. Task Scheduler

To support logical pipelining as discussed above, a Task Scheduler 151 is provided to retrieve data objects from system memory 170, forward it to the corresponding ASIC computation logic, and then return it back to another specified location in memory 170 once the computation is done.

Figure 6:
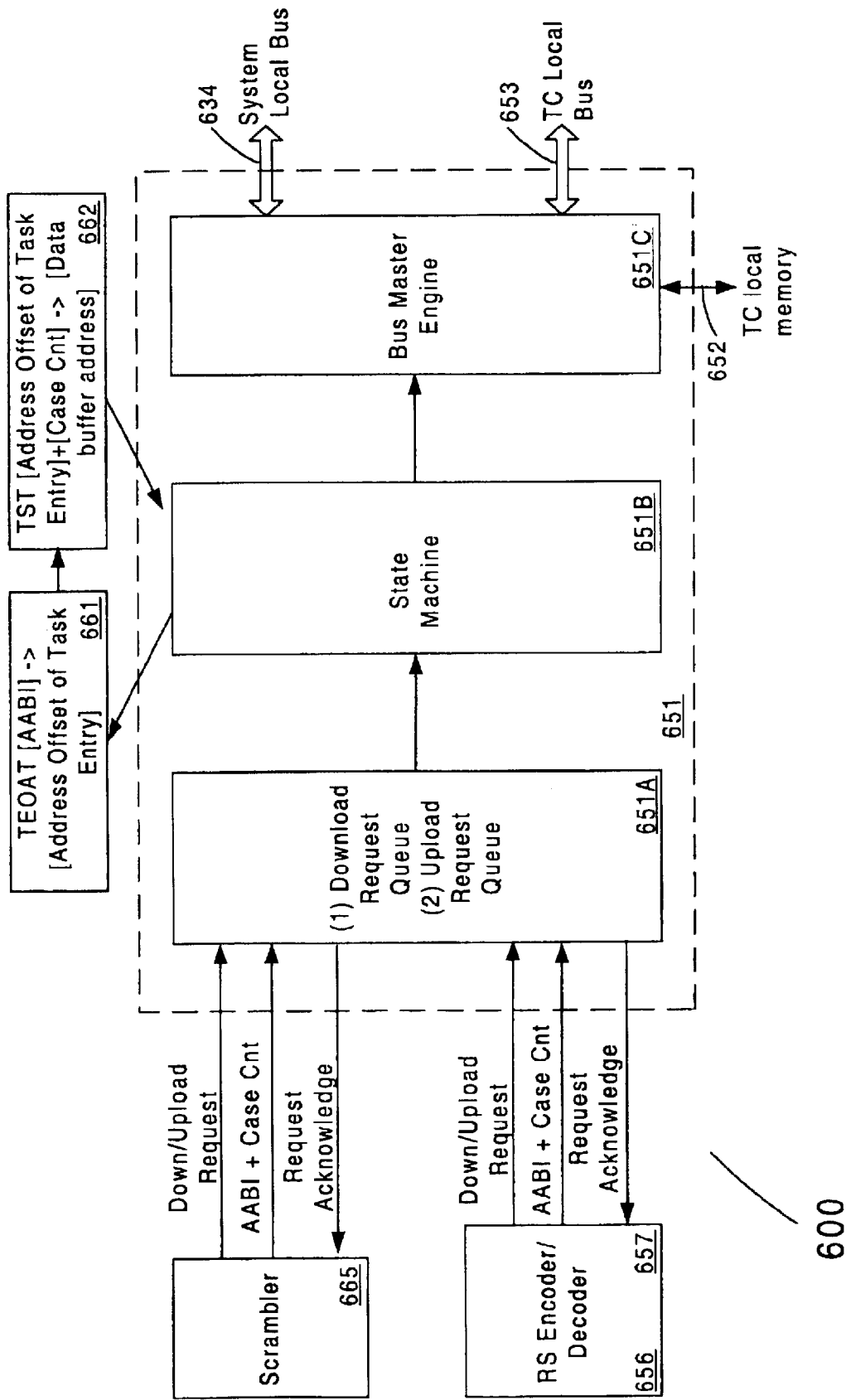
FIG. 6 is a block diagram depicting the material aspects of an embodiment of a task scheduler of the present invention, and which is also particularly suitable for use with the embodiment of FIG. 4.

The detailed operation and structure of the TC task scheduler 151 (TTS) for multi-channel operation is explained below. A block diagram of the TC task scheduler is shown in FIG. 6; in this figure, like numerals are intended to denote like structures from earlier figures unless stated otherwise, so that, for example, TTS 651 in FIG. 6 is equivalent to TTS 151 shown in FIG. 1 and so forth. TTS 651 is thus adapted to operate as follows:

1. Each ASIC xDSL Function block coupled to TC Local Bus 653 is first assigned with a 6-bit ID identified as ADSL ASIC Block ID (AABI). This format for AABI is merely desirable for the present architecture, and any suitable length can be used for a particular application.

For multiple but identical blocks in the case of multiple port solution (for example, two RS blocks may be required to support 16 ADSL channel processing), each one is assigned with a unique ID.

2. Each ASIC xDSL Function block coupled to TC Local Bus 653 also has an internal register called Total Computation Round (not shown) that is preset by system software with the total number of computation rounds per DMT cycle that such block is used. Accordingly, this number is greater than 1 when an block is shared with multiple ports. This corresponds generally with the time sharing factor mentioned earlier, and is a significant EMKG enhancer when the particular function involved does not require significant computation time as compared to a DMT symbol time.

3. Each ASIC xDSL Function block increases a value stored in a corresponding Actual Computation Round counter (not shown) when it finishes one round of computation. Thus, while an Actual Computation Round register indicates that some number of computations fewer than the number specified in Total Computation Round has passed, the ASIC xDSL Function block will continue to generate data download and upload requests for each round. The Actual Computation Round counter will be reset to 0 when it starts a new DMT symbol cycle.

4. A download request occurs when an ASIC xDSL Function block (such as a RS Encoder/Decoder 656 or Scrambler 655) is ready to start a new computation and therefore it asks TTS 651 to download a new data block through a request control line as seen in FIG. 6. Once a Data Object 300 is downloaded, the ASIC xDSL Function block will start the appropriate computation automatically during normal operation. An upload request correspondingly occurs when the ASIC xDSL Function block completes its task and signals to TTS 651 that is ready to upload the processed data in the Data Object 300.

5. Each ASIC xDSL Function block also has a set of control signals as shown in FIG. 6 that are used to send request and receive acknowledgments to TTS 651. This includes download request, upload request, computation count, AABI, and the acknowledgment from TTS 651. It will be apparent to those skilled in the art that the particular implementation of these control lines is not critical, and that they can be implemented in any variety of ways to achieve the objectives of the invention.

6. For each request made by an ASIC xDSL Function block, TTS 651 stores it to one of two queues (a download and upload request respectively) identified as structure 651A. For subsequent processing, each request consists of the following fields: (1) 6-bit AABI, (2) 6-bit computation count, and (3) 1-bit request type (download/upload). The total word size is thus selected to be 16-bits with a few reserved bits usable for future modifications. Again, the particular structure of TTS queue 651*a* is not material, and it can be effectuated using any number of known techniques.

7. A TTS state machine 651B then reads each request placed in the download and upload request queues. The order in which they are read can be programmed to occur in a priority fashioned in accordance with system requirements. For each request, TTS state machine 651B performs the following operations:
   a. First, it uses the AABI value to get an offset address (Task Entry Offset Address TEOA) from a Task Entry Offset Address Table 661 (TEOAT), which gives an offset address that stores the necessary information for TTS state machine 651B to perform data transfer. The size of TEOAT 661 is nominally set to be 32-bits wide and the number of entries is equal to the total number of computation rounds required by the combined set of AABI's in TC subsystem 600. In a preferred implementation, TEOAT 661 is a table located and stored in local memory 652 for TC subsystem 650.
   b. TTS state machine 651B then uses the combination of TEOA plus a computation count for the particular ASIC xDSL Function block to read a starting address of the appropriate Data Block 300 as it is stored in a Task Scheduling Table 662 (TST) for either download or upload. For simplicity, TST 662 is also stored in a memory block 652 local to TC subsystem 650. State machine 651A maintains a bit in its local control register to indicate which one of the dual buffers is used for the data transfer.
   c. Both TEOAT 661 and TST 662 are programmable by software. Therefore, this structure is generic and can be scalable for different ASIC/software partition and programmable for future ADSL standards changes.

8. State machine 651B then sets up Bus Master Engine 651C (BME) with appropriate parameters for perfoming a direct memory access (DMA) function, and then triggers BME 652C to start the data transfer process (i.e., loading or unloading of a Data Object 310 to or from an ASIC block).
   a. For a data transfer involving a Data Object stored/retrieved from external system memory 170, then BME 651C sends the request to memory controller 130.
   b. For data transfers associated with Data Objects stored/retrieved from local intermediate buffer 652, then BME 651C conducts the data transfer.

9. Once a data transfer is started by one of these other entities, TTS state machine 651B is then free to proceed with the next request even before the transfer is completed. This reduces a request processing time.

The queue size for each download/upload request queue is 32 entries, and the only real constraint is that it needs to be larger than the total number of ASIC blocks in the TC subsystem. As a result, the size of TEOAT is also 32 entries with 32-bit of each entry.

Table 700 in FIG. 7A illustrates a portion of a preferred embodiment of TST 662 (the first two columns shown— Location 701 and TST entry address 702) along with explanatory information in fields identifying a Port 703 served by an ASIC xDSL function block, a field identifying an Operation 704 performed by an ASIC xDSL function block, and relevant remarks 705 concerning such ASIC xDSL function block. For example, a number of Data Objects (2N−1 in fact where N is a number of ports) are used by an ASIC xDSL function block that implements two different functions for both receive and transmit tasks; in other words, a CRC Scrambler and a CRC/Descrambler. So this same ASIC xDSL function block is used for two different functions in a transmit direction and two different functions for a receive direction for multiple ports and all during the same DMT symbol period. All in all, therefore, this particular block performs 4 different functions during such period, resulting in a total number of computation rounds of 4*N for an N port capable ASIC xDSL function block. This results in a total number of entries equal to 4N−1 for this particular ASIC block.

Table 700 provides additional information for the other hardware based xDSL functions in the logical pipeline. In the case where the same type of ASIC block (such as RS encoder/decoder) needs to be instantiated twice for a large number of ports, each of them is preferably assigned a unique AABI. Again, it will be understood that the embodiment in FIG. 7A is merely one possible implementation of Table 700, and that any appropriate memory, cache or buffering mechanism can be used to identify the TST entry addresses.

Each entry 702 of TST table 662 is generated by TSS State machine 651B and consists of three 32-bit data transfer control words as shown in FIG. 7B. These include generally: a first data control transfer word 702A having: (1) a 12-bit Input Data Block Size identifying a size in memory occupied by a Data Object to be used as an Input by an ASIC block; (2) a 12-bit Output Data Block Size identifying a size in memory occupied by a Data Object generated as an output by an ASIC block; (3) 6-bit Port ID. These bits can also be used for hardware/software tracking/debugging. No ASIC implementation is required on these bits. (4) Memory Location Bit; when set to 0 this indicates a transfer from an ASIC block to System memory; when set to 1 this indicates an ASIC block to Intermediate buffer 652 transfer. A second data control word 702B identifies a 32-bit start address of a download, if applicable. In other words, this indicates from where BME 651C is to read data. A third data transfer control word indicates a 32-bit start address to be used for an upload if applicable—i.e., it indicates where BME 651C is supposed to write data.

As can be seen with reference to the above and FIG. 1, this arrangement of TC subsystem 150 allows it also to be implemented as a form of logical pipeline within the larger logical hybrid pipeline. This is because at each pipeline clock interval each of the ASICs performs a particular operation on an input Data Object, and the resulting output Data Object can be stored in TC memory 152 for use by another ASIC in the subsystem. Using this form of common memory, eliminates the need for individual buffer stages between the ASIC blocks, and allows for greater flexibility since the pipeline operation (i.e., a particular set of needed operations) can be programmed in any sequence, and with certain ASICs added or dropped as may be required for any particular environment. Accordingly it is expected that this architecture for TC subsystem 150 will be beneficial both for xDSL environments and other systems requiring a flexible pipeline architecture.

G. PMD Layer and Task Scheduler

PMD subsystem 120 is shown generally in FIG. 1, and consists of a DSL link interface 110 with external codecs 105, digital filters (decimator and interpolator) 124 and 125, a TEQ (time domain equalizer) 123, FFT/IFFT 122, and PMI) task scheduler 121. Task scheduler 121 receives data transfer requests from dual buffer 124 and FFT/IFFT 122 and works with BME 651C to perform the data transfer.

PMD subsystem (layer) 120 thus operates in a similar way to TC Subsystem (layer) 150 layer in terms of Data-Object based operations and transfers, except that it is not part of the logical hybrid pipeline. Therefore, there is a similar task scheduler (not shown) within the PMD layer used to transfer data objects between other portions of the pipeline and PMD functional blocks. The structure and operation of such task scheduler will be apparent to those skilled in the art from the present discussion, and particularly that set out above for TTS 151, so it is not presented here.

Further as shown in FIG. 1, there are two blocks that are shared for multi-channel operation: FFT 122 and TEQ 123. The former for both receive/transmit tasks, and the latter only for a number of separate receive ports. On the other hand, as explained earlier, due to the physical nature of operating an ADSL link, decimator 124, interpolator 125 and their corresponding dual buffers are usually allocated as one individual set for each ADSL channel (port). Again, as explained above, there may be other applications where this is not necessary or desirable, so that such features might also be shared in some fashion.

In a transmission path, FFT/IFFT block 122 requests Data Objects from PMD task scheduler 121 to perform an IFFT operation. After computation, instead of returning the output back to the inner pipeline in the form of a Data Object, it instead merely forwards the IFFT result to an interpolator 125 for the corresponding ADSL channel (port). In a receiving path, an output from a decimator 124 of each ADSL channel (port) is first processed by TEQ 123 and then FFT 122. There is internal data objects transferred between these blocks through PMD task scheduler 120 The finished result is then sent back to system 100 for TC subsystem 150 to continue the demodulation process.

Again, while PMD subsystem 120 is not a part of the logical hybrid pipeline, it nonetheless uses the common memory 170 for exchanging Data Objects so that a common consistent data exchange mechanism is used for both pipelined and non-pipelined portions of the communication system. In addition, by using Data Object as input/output parameters, TEQ 123 and FFT 122 can be shared by multiple ports and thus achieve the same functionality as the ASIC blocks in TC subsystem 150.

H. Power Management

For a given number of ADSL ports, each ASIC block is designed to operate all ports at a data rate equal, if necessary, to a full-rate. However, in practice, each port may operate at a reduced rate because of system constraints (i.e., total MIPS power) channel constraints (noise and other disturbances), and user provisions (based on particular operating needs and costs). For example, some users may choose to operate only at a lower selected rate that fits their cost requirements when an ADSL service is operated at a tier-pricing structure. Furthermore, each ADSL port may not need to support traffic transmission all the time. It is likely that sometime during a day there is an idle period where there is no traffic.

Therefore, in such cases it is desirable to reduce the overall ASIC power dissipation when the ADSL lines are operated at a reduced rate or are idle. This can be done again by implementing a scaleable architecture as described in the aforementioned pending application Ser. No. 08/884,895 by the applicant. In particular:

1. Other than a codec interface, interpolation and decimation filters, and related logic that needs to operate at an ADSL codec sampling clock, the other system blocks can be operated at a lower clock to reduce overall power dissipation. For example, the rest of the PMD subsystem (including TEQ, FFT, IFFT), the TC subsystem, and the microprocessor subsystem can be all clocked at a lower rate when the computation requirement is reduced.

2. For a given requested user line rate, the present invention may simply process only a subset of the DMT tones to meet the line rate requirement. The other tones are idle and are not processed.

I. DSL Link

An interface between the present system and external ADSL codecs can be implemented in a number of ways. A particularly advantageous approach is disclosed in pending application Ser. No. 09/255,235 assigned to the applicant, filed Feb. 22, 1999 and entitled Universal DSL ink Interface Between A DSL Digital Controller And A DSL Code, which is hereby incorporated by reference. With the time sharing capability of multiple ADSL ports over a single DSL link, the present system can be easily configured for different number of ports without adding unnecessary pins. Furthermore, as explained earlier, the protocol used in such novel DSL link discussed earlier and set forth in the aforementioned application is extremely useful for a multi-port environment.

J. VoDSL Port

The present architecture can also easily be adapted to work with so-called Voice over DSL (VoDSL) systems. An additional VoDSL port (not shown in the block diagram) can be provided through the Memory Controller and Bus Master 130 for a direct PSTN PCM interface. From a data flow point of view, VoDSL data is first formatted in ATM cells and then transmitted over the ADSL line. This is called VoDSL over ATM over ADSL. In the present system, host/DSP software routines can further perform ATM layer functions and format VoDSL data into a PCM format (T1 or E1, for example). This PCM-equivalent port is called a VoDSL port and be interfaced with either voice codecs (in CPE) or a PSTN digital phone switch (in CO).

From the above explanation, some of the more important innovations introduced in the present disclosure for implementing a multiple-port ADSL solution can be summarized as follows:

1. An efficient gate count design can be achieved based on EMKG considerations.
2. Gate count efficiency is further ehanced by sharing the same ASIC block for both transmission and receiving.
3. Gate count design efficiency is also enhanced by sharing the same ASIC block for multiple ports.
4. Gate use is also optimized by consolidating ASIC symbol block buffers with system memory.
5. A logical pipeline removes timing dependencies between each ADSL block, whether it is implemented in ASIC or software form.
6. A logical hybrid pipeline allows flexible software and hardware implementation for various ADSL blocks.
7. Symbol "stuffing" allows multiple port data to be processed synchronously.
8. Data Objects allow each ASIC block to dynamically process ADSL data on a per port and per symbol basis.
9. A flexible, programmable design is effectuated by using ASIC blocks as programmable co-processors, and with the Data Object control information cooperating like instruction operands.
10. A flexible, programmable design is achieved by having an ASIC based task scheduler.
11. Transfer bandwidth is relaxed by having local bus and local memory for the PMD and TC subsystem.
12. Flexible software and ASIC task interface and scheduling is accomplished by having a dual buffer (two pages of data) between consecutive software and ASIC tasks.
13. A scalable architecture allows the PMD, TC, and the microprocessor/DSP subsystem to be individually optimized based on particular computation requirements.
14. Configurable architecture that allows a single chip implementation to be used as either a single-port ATU-R, single-port ATU-C, two-port ATU-C, two-port ATU-R, and one-port ATU-C plus one-port ATU-C as an ADSL repeater.
15. An architecture that allows a multiple port design at as low as 700 k transistor count per port.
16. An integrated design adapted so that software provides the maximum programming flexibility and hardware provides the minimum transistor count.

While this invention has been described with reference to illustrative embodiments, this description is not intended to be construed in a limiting sense. It will be clearly understood by those skilled in the art that foregoing description is merely by way of example and is not a limitation on the scope of the invention, which may be utilized in many types of integrated circuits made with conventional processing technologies. Various modifications and combinations of the illustrative embodiments, as well as other embodiments of the invention, will be apparent to persons skilled in the art upon reference to the description. Such modifications and combinations, of course, may use other features that are already known in lieu of or in addition to what is disclosed herein. It is therefore intended that the appended claims encompass any such modifications or embodiments. While such claims have been formulated based on the particular embodiments described herein, it should be apparent the scope of the disclosure herein also applies to any novel and non-obvious feature (or combination thereof) disclosed explicitly or implicitly to one of skill in the art, regardless of whether such relates to the claims as provided below, and whether or not it solves and/or mitigates all of the same technical problems described above. Finally, the applicants further reserve the right to pursue new and/or additional claims directed to any such novel and non-obvious features during the prosecution of the present application (and/or any related applications).

What is claimed is:

1. A logical hybrid pipeline comprising:

a first set of hardware based pipeline stages; and a second set of software based pipeline stages coupled to said first set of hardware based pipeline stages;

a common pipeline clock to initiate processing of data by both said first set of hardware based pipeline stages and said second set of software based pipeline stages during a pipeline clock; and a common pipeline memory to store processing results from both said first set of hardware based pipeline stages and said second set of software based pipeline stages; and wherein said processing of data occurs in an interleaved manner between said first set of hardware based pipeline stages and said second set of software based pipeline stages, such that processing results are exchanged between said first set of hardware based pipeline stages and said second set of software base pipeline stages during said pipeline clock period through said common pipeline memory.

2. The logical hybrid pipeline of claim 1, wherein said first set of hardware based pipeline stages includes one or more application specific integrated circuit (ASIC) logic circuits.

3. The logical hybrid pipeline of claim 1, wherein said second set of software based pipeline stages includes one or more general purpose processors executing software and/or firmware instructions.

4. The logical hybrid pipeline of claim 1, wherein said common pipeline memory includes an external memory.

5. The logical hybrid pipeline of claim 4, wherein said common pipeline memory includes as a system memory capable of being shared with a host computing system.

6. The logical hybrid pipeline of claim 1, wherein said first set of hardware based pipeline stages and/or said second set of software based pipeline stages is expandable to include additional pipeline stages.

7. The logical hybrid pipeline of claim 1, wherein input and output to said first set of hardware based pipeline stages and said second set of software based pipeline stages is implemented in the form of a data object, said data object including both control parameters and computations results for a block of processed data.

8. The logical hybrid pipeline of claim 7, wherein an output data object from a first pipeline stage includes control parameters used by both a subsequent second pipeline stage, and one or more subsequent third pipeline stages.

9. The logical hybrid pipeline of claim 1, wherein said processing of data is done for a plurality of communications ports, such that said plurality of communications ports share a single logical processing pipeline for a series of receive and transmit operations.

10. A processing pipeline comprising:
an input buffer to receive digital data signals associated with a communications transmission transporting a data stream, said communications transmission requiring a set of predefined signal processing operations to extract said data stream from said digital data signals; and
a plurality of interconnected pipeline stages, each of said pipeline stages being adapted to perform at least one processing operation associated with said set of predefined signal processing operations; and
a common pipeline memory to store intermediate processing results for all of said plurality of interconnected pipeline stages;
an output buffer to receive an output from said plurality of interconnected pipeline stages, said output corresponding to data in said data stream; and
wherein a logical hybrid pipeline is effectuated for performing said set of predefined signal processing operations by passing data between some or all of said pipeline stages using said common pipeline memory.

11. The processing pipeline of claim 10 wherein said data stream includes a bit stream, a packet based stream, or a cell based stream.

12. The processing pipeline of claim of 10 wherein said data stream includes asynchronous transfer mode (ATM) cells and/or digitized voice data over a digital subscriber loop (DSL).

13. The processing pipeline of claim 10 wherein at least one of said pipeline stages is implemented in software to implement a logical hybrid processing pipeline.

14. The processing pipeline of claim 10 wherein said plurality of interconnected pipeline stages implement a physical medium dependent layer and/or a transport convergence layer.

15. The processing pipeline of claim 10 wherein said plurality of interconnected pipeline stages operate on a number of different DMT based symbols within a single pipeline clock period.

16. The processing pipeline of claim 10 wherein a plurality of data streams for a plurality of communications port are processed simultaneously.

17. The processing pipeline of claim 10, wherein resources for said plurality of interconnected pipeline stages are scaleable so as to satisfy performance requirements of a communications protocol used for said communications transmission.

18. The processing pipeline of claim 10, wherein M separate pipeline stages are used to perform N separate signal processing operations for n separate communications ports, where M<N*n.

19. A logical hybrid processing pipeline comprising:
a first set of hardware based pipeline stages configured as one or more application specific integrated circuit (ASIC) logic circuits; and
a second set of software based pipeline stages configured as one or more general purpose processors executing software and/or firmware instructions; and
the logical hybrid processing pipeline being further configured such that each pipeline stage of said first set of hardware based pipeline stages and said second set of software based pipeline stages receives an associated input data object for such pipeline stage from a prior pipeline stage implemented in hardware or software, and then performs a processing operation on said associated input data object to generate an associated output data object for such pipeline stage; and
a common pipeline clock to initiate said processing operation for both said first set of hardware based pipeline stages and said second set of software based pipeline stages;
wherein a plurality of associated input data objects are processed in a plurality of processing operations within a pipeline time interval associated with said common pipeline clock to generate a plurality of associated output data objects; and
a pipeline memory to store some or all of said plurality of associated input data objects and said plurality of associated output data objects;
wherein said pipeline memory is configured in the processing pipeline such that said some or all of said plurality of associated input data objects and said plurality of associated output data objects can be exchanged between said first set of hardware based pipeline stages and said second set of software based pipeline stages to effectuate a logical pipeline, and without using individual fixed hardware based buffers between pipeline stages.

20. The logical hybrid processing pipeline of claim 19, wherein said one or more general purpose processors include one or more digital signal processors DSPs and/or microprocessors.

21. The logical hybrid processing pipeline of claim 19, wherein said common pipeline clock is used by said one or more general purpose processors as a program interrupt.

22. The logical hybrid processing pipeline of claim 19, wherein said first set of hardware based pipeline stages further includes a field programmable gate array.

23. The logical hybrid processing pipeline of claim 19, further including a task scheduler for responding to and satisfying requests for said associated input data objects by said first set of hardware based pipeline stages.

24. The logical hybrid processing pipeline of claim 19, wherein said first set of hardware based pipeline stages includes a decoder for decoding an instruction and an operand included with said associated input data objects.

25. The logical hybrid processing pipeline of claim 19 wherein said pipeline memory includes separate pages to store said plurality of associated input data objects and said plurality of associated output data objects.

26. The logical hybrid processing pipeline of claim 25, wherein said one or more application specific integrated circuit (ASIC) logic circuits and said one or more general purpose processors each receive input from one page in the pipeline memory, and generate output to another page in the pipeline memory.

27. The logical hybrid processing pipeline of claim 19, wherein any number of ASIC logic circuits can be added or dropped to maximize programmability.

28. A method of operating a pipeline comprising the steps of:
- providing a first type of pipeline stage, said first type of pipeline stage forming part of a set of hardware based pipeline stages;
- providing a second type of pipeline stage, said second type of pipeline stage forming part of a set of software based pipeline stages;
- coupling said set of hardware based pipeline stages to said set of software based pipeline stages so that operational data can be exchanged between two adjacent and different types of pipeline stages; and
- providing a common pipeline clock for initiating processing of data by both said set of hardware based pipeline stages and said set of software based pipeline stages.

29. The method of claim 28, further comprising:
- passing a processing result from said first type of pipeline stage to said second type of pipeline stage in consecutive pipeline stages and/or from said second type of pipeline stage to said first type of pipeline stage in consecutive pipeline stages so as to implement a logical processing pipeline.

30. The method of claim 29, further comprising:
- storing said processing result in a common pipeline memory.

31. The method of claim 29 further comprising:
- expanding and/or reducing said set of hardware based pipeline stages and/or said of software based pipeline stages to add and/or remove pipeline stages.

32. The method of claim 29, wherein input and output to said set of hardware based pipeline stages and said set of software based pipeline stages is implemented in the form of a data object, said data object including both control parameters and computations results for a block of processed data.

33. The method of claim 29, wherein an output data object from a first pipeline stage includes control parameters used by both a subsequent second pipeline stage, and one or more subsequent third pipeline stages.

34. The method of claim 29, wherein said processing of data is done for a plurality of communications ports, such that said plurality of communications ports share a single logical processing pipeline for a series of receive and transmit operations.

35. A method of operating a communications pipeline comprising the steps of:
- receiving digital data signals associated with a communications transmission transporting a data stream, said communications transmission requiring a set of predefined signal processing operations to extract said data stream from said digital data signals;
- performing processing operations associated with said set of predefined signal processing operations using a plurality of interconnected pipeline stages, such that each of said pipeline stages being adapted for performing at least one processing operation;
- storing intermediate processing results for all of said plurality of interconnected pipeline stages in a common memory;
- receiving an output from said plurality of interconnected pipeline stages, said output corresponding to data in said data stream;
- wherein a logical pipeline is effectuated for a performing said set of predefined signal processing operations to extract said data stream.

36. The method of claim 35 wherein said data stream includes is a bit stream, a packet based stream, or a cell based stream.

37. The method of claim of 35 wherein said data stream includes asynchronous transfer mode (ATM) cells and/or digitized voice data over a digital subscriber loop (DSL).

38. The method of claim 35 wherein said plurality of interconnected pipeline stages operate on a number of different discrete multi-tone (DMT) based symbols within a single pipeline clock period.

39. The method of claim 35 wherein at least one of said pipeline stages is implemented in software to implement a logical hybrid processing pipeline.

40. The method of claim 35, further comprising:
- allocating additional computing resources to said plurality of interconnected pipeline stages so as to scale a performance of the pipeline as needed to satisfy requirements of said communications transmission.

41. A method of operating a pipeline including the steps of:
- configuring one or more application specific integrated circuit (ASIC) logic circuits to form a first set of hardware based pipeline stages;
- configuring one or more general purpose processors executing software and/or firmware instructions to form a second set of software based pipeline stages;
- interconnecting the pipeline such that each pipeline stage of said first set of hardware based pipeline stages and said second set of software based pipeline stages receives an associated input data object for such pipeline stage and performs a processing operation on said associated input data object to generate an associated output data object for such pipeline stage;
- providing a common pipeline clock to initiate said processing operation for both said first set of hardware based pipeline stages and said second set of software based pipeline stages;
- wherein a plurality of associated input data objects are processed in a plurality of processing operations within a pipeline time interval associated with said common pipeline clock to generate a plurality of associated output data objects; and
- providing a pipeline memory for storing some or all of said plurality of associated input data objects and said plurality of associated output data objects; and
- exchanging said some or all of said plurality of associated input data objects and said plurality of associated output data objects between said first set of hardware based pipeline stages and said second set of software based pipeline stages to effectuate a logical pipeline.

42. The method of claim 41, further comprising:
- augmenting resources for said second set of software based pipeline stages by coupling one or more additional general purpose processors to perform additional pipeline operations.

43. The method of claim 41, further comprising:
- using said second set of software based pipeline stages to configure one or more of said associated input data objects with control information useable by said first set of hardware based pipeline stages at a later processing step occurring within the pipeline.

44. The method of claim 43, wherein said control information is used to modify an operation of one or more pipeline stages included as part of said first set of hardware based pipeline stages.

45. The method of claim 41, further comprising:
- expanding and/or reducing said first set of hardware based pipeline stages and/or said of software based pipeline stages to add and/or remove pipeline stages.

* * * * *